(12) United States Patent
Luescher et al.

(10) Patent No.: US 11,890,720 B2
(45) Date of Patent: Feb. 6, 2024

(54) QUICK CLAMPING DEVICE FOR A PORTABLE POWER TOOL HAVING AT LEAST ONE ROTATABLY DRIVABLE OUTPUT SHAFT, IN PARTICULAR AN ANGLE GRINDER

(71) Applicant: Robert Bosch GmbH, Stuttgart (DE)

(72) Inventors: Bruno Luescher, Vordemwald (CH); Andreas Zurbruegg, Lohn-Ammansegg (CH)

(73) Assignee: Robert Bosch GmbH, Stuttgart (DE)

( * ) Notice: Subject to any disclaimer, the term of this patent is extended or adjusted under 35 U.S.C. 154(b) by 1329 days.

(21) Appl. No.: 16/341,429

(22) PCT Filed: Oct. 4, 2017

(86) PCT No.: PCT/EP2017/075106
§ 371 (c)(1),
(2) Date: Apr. 11, 2019

(87) PCT Pub. No.: WO2018/072995
PCT Pub. Date: Apr. 26, 2018

(65) Prior Publication Data
US 2020/0039026 A1   Feb. 6, 2020

(30) Foreign Application Priority Data
Oct. 18, 2016   (DE) .................... 10 2016 220 343.6

(51) Int. Cl.
| B24B 45/00 | (2006.01) |
| B23B 31/18 | (2006.01) |
| B24B 23/02 | (2006.01) |

(52) U.S. Cl.
CPC ............ B24B 45/006 (2013.01); B23B 31/18 (2013.01); B24B 23/028 (2013.01)

(58) Field of Classification Search
CPC ..... B24B 23/028; B24B 23/022; B24B 23/02; B24B 23/005; B24B 27/08; B24B 41/002; B24B 45/006
See application file for complete search history.

(56) References Cited

U.S. PATENT DOCUMENTS 5,601,483 A   2/1997   Rudolf et al.

FOREIGN PATENT DOCUMENTS

| CN | 88100274 A | 7/1988 |
| CN | 1185764 A | 6/1998 |

(Continued)

OTHER PUBLICATIONS

International Search Report corresponding to PCT Application No. PCT/EP2017/075106, mailed Jan. 9, 2018 (German and English language document) (5 pages).

*Primary Examiner* — Joel D Crandall
(74) *Attorney, Agent, or Firm* — Maginot, Moore & Beck LLP

(57) ABSTRACT

A quick clamping device for a portable power tool includes at least one rotatably drivable output shaft, at least one clamping unit, at least one operating unit, and at least one uncoupling unit. The clamping unit, for tool-free fastening of an insert tool unit to the output shaft, includes at least one movably mounted clamping element for applying clamping force to the insert tool unit in a clamping position of the clamping element. The operating unit is configured to move the clamping element into the clamping position and/or into a release position of the clamping element. In the release position, the insert tool unit can be removed from the clamping unit. The at least one uncoupling unit is configured to uncouple the operating unit from the clamping unit in accordance with the rotational speed of the output shaft.

16 Claims, 9 Drawing Sheets

(56) References Cited

FOREIGN PATENT DOCUMENTS

| | | | |
|---|---|---|---|
| CN | 1590012 A | 3/2005 | |
| CN | 1946517 A | 4/2007 | |
| CN | 1980763 A | 6/2007 | |
| CN | 101003119 A | 7/2007 | |
| CN | 101176970 A | 5/2008 | |
| CN | 102348533 A | 2/2012 | |
| CN | 103189165 A | 7/2013 | |
| CN | 104551224 A | 4/2015 | |
| CN | 105364788 A | 3/2016 | |
| CN | 205057102 U | 3/2016 | |
| DE | 32 11 844 A1 | 10/1983 | |
| DE | 19752810 A1 * | 6/1998 | ........... B24B 23/022 |
| DE | 100 17 458 A1 | 10/2001 | |
| EP | 0133645 A2 * | 3/1985 | |
| EP | 0 319 813 A2 | 6/1989 | |
| EP | 031981 B1 * | 5/1992 | |
| EP | 1 790 434 A1 | 5/2007 | |
| JP | 660-39064 A | 2/1985 | |
| JP | H01-193164 A | 8/1989 | |
| KR | 20100008489 A * | 1/2010 | |
| RU | 2 465 117 C2 | 10/2012 | |
| RU | 2 595 791 C2 | 8/2016 | |
| RU | 2 596 541 C2 | 9/2016 | |

\* cited by examiner

QUICK CLAMPING DEVICE FOR A PORTABLE POWER TOOL HAVING AT LEAST ONE ROTATABLY DRIVABLE OUTPUT SHAFT, IN PARTICULAR AN ANGLE GRINDER

This application is a 35 U.S.C. § 371 National Stage Application of PCT/EP2017/075106, filed on Oct, 4, 2017, which claims the benefit of priority to Serial No. DE 10 2016 220 343.6 filed on Oct. 18, 2016 in Germany, the disclosures of which are incorporated herein by reference in their entirety.

BACKGROUND

DE 100 17 458 A1 has already disclosed a quick clamping device for a portable power tool, in particular angle grinder, which has at least one output shaft which can be driven in rotation, having at least one clamping unit which, for tool-free fixing of an insert tool unit to the output shaft, has at least one movably mounted clamping element for exertion of a clamping force on the insert tool unit in a clamping position of the clamping element, and having at least one operator control unit for moving the clamping element into the clamping position and/or into a release position of the clamping element, in which the insert tool unit can be removed from the clamping unit and/or from the output shaft.

SUMMARY

The invention proceeds from a quick clamping device for a portable power tool, in particular angle grinder, which has at least one output shaft which can be driven in rotation, having at least one clamping unit which, for tool-free fixing of an insert tool unit to the output shaft, has at least one movably mounted clamping element for exertion of a clamping force on the insert tool unit in a clamping position of the clamping element, and having at least one operator control unit for moving the clamping element into the clamping position and/or into a release position of the clamping element, in which the insert tool unit can be removed from the clamping unit and/or from the output shaft.

It is proposed that the quick clamping device comprises at least one decoupling unit which is provided for decoupling the operator control unit from the clamping unit in a manner dependent on a rotational speed of the output shaft. The decoupling unit is preferably provided for decoupling the operator control unit from the clamping unit in a manner dependent on a rotational speed of the output shaft, which is in particular higher than 100 rpm, preferably higher than 500 rpm, particularly preferably higher than 1000 rpm, and particularly preferably higher than 5000 rpm. In the case of a rotational speed of the output shaft of in particular less than 1000 rpm, preferably of less than 500 rpm and particularly preferably less than 100 rpm, the decoupling element is provided for coupling the operator control unit to the clamping unit, in particular in order to permit a movement of the clamping element by means of an action of an operator force imparted by the operator control unit. "Provided" is to be understood in particular to mean specially programmed, configured and/or equipped. The statement that an element and/or a unit is provided for a particular function is to be understood in particular to mean that the element and/or the unit carry/carries out and/or perform/performs said particular function in at least one state of use and/or operation. "Movably mounted" to be understood in particular to mean a mounting of an element and/or of a unit, wherein the element and/or the unit have/has a movement capability, in particular decoupled from an elastic deformation of the element and/or of the unit, along a movement axis of more than 5 mm, preferably of more than 10 mm and particular preferably of more than 50 mm and/or about a movement axis along an angle range of more than 1°, preferably of more than 5° and particularly preferably of more than 15°.

The decoupling unit is preferably provided for preventing and/or interrupting a transmission of an actuating force from the operator control unit to the clamping unit, and/or converting said actuating force into a movement of the decoupling element, in a manner dependent on a rotational speed of the output shaft. In particular, the decoupling element is provided for preventing and/or interrupting a force-transmitting connection between the operator control unit and the clamping unit in a manner dependent on a rotational speed of the output shaft. Preferably, the decoupling element is designed as a mechanical decoupling element. The decoupling unit is preferably provided for decoupling the operator control unit from the clamping unit, in a manner dependent on a rotational speed of the output shaft, owing to a relative movement between at least one element of the operator control unit and at least one element of the clamping unit and/or decoupling unit. The decoupling unit may have a clutch element, a centrifugal element, a friction element, or some other element that would appear expedient to a person skilled in the art, by means of which the operator control unit can be decoupled from the clamping unit in a manner dependent on a rotational speed of the output shaft. It is however also conceivable for the decoupling unit to be designed as an electric and/or electronic decoupling unit. For example, in the case of an embodiment of the decoupling unit as an electric and/or electronic decoupling unit, it is conceivable for a rotational speed of the output shaft to be electronically detectable, for example by means of at least one sensor element of the decoupling unit or by means of an electronic evaluation of drive unit characteristic variables, wherein a lock of the decoupling unit, which lock activates or deactivates an actuation of the operator control unit, can be actuated by means of an actuator of the decoupling unit in a manner dependent on a rotational speed of the output shaft, and/or wherein a clutch of the decoupling unit, which clutch opens or closes a force transmission connection between the operator control unit and the clamping unit, can be actuated by means of an actuator of the decoupling unit in a manner dependent on a rotational speed of the output shaft. Further embodiments of the decoupling unit that appear expedient to a person skilled in the art are likewise conceivable. The decoupling unit is preferably arranged at least partially on and/or in the output shaft. By means of the decoupling unit, it is preferably possible for a movement of the clamping element owing to an actuation of an operator control element of the operator control unit to be prevented in a manner dependent on a rotational speed of the output shaft.

The clamping element is preferably arranged at least partially in the output shaft. It is preferable for the output shaft to at least partially, in particular completely, surround the clamping element along a circumferential direction running around an axis of rotation of the output shaft. The clamping element is preferably connected rotationally conjointly to the output shaft. The clamping element is preferably mounted so as to be pivotable about a pivot axis of the clamping element. The pivot axis of the clamping element preferably runs transversely, in particular at least substantially perpendicularly, with respect to the axis of rotation of the output shaft. The pivot axis of the clamping element preferably runs at least substantially perpendicular to a clamping axis of the clamping unit. Here, a "clamping axis" is to be understood in particular to mean an axis of the clamping unit along which an axial securing force of the clamping unit can be exerted on the insert tool unit in order to fix the insert tool unit on the output shaft and/or along which a transmission element of the clamping unit is mounted so as to be movable for a movement of the clamping element. "At least substantially perpendicular" is to be understood in particular to mean an orientation of a direction relative to a reference direction, wherein the direction and the reference direction, viewed in particular in one plane, enclose an angle of 90°, and the angle has a maximum deviation of in particular less than 8°, advantageously less than 5° and particularly advantageously less than 2°. The clamping element is preferably formed as a clamping jaw. The clamping element is preferably provided for securing the insert tool unit axially on the output shaft. Preferably, the clamping element, at least in the clamping position, engages at least partially into the insert tool unit, in particular into a fixing recess of the insert tool unit. Preferably, at least in a state in which the insert tool unit is fixed by means of the clamping unit, the clamping element engages behind a clamping projection of the insert tool unit.

The clamping element is preferably movable by means of the operator control unit into the clamping position and/or into the release position by means of a mechanical connection between at least the operator control element of the operator control unit and the clamping element. The operator control element is preferably designed as an operator control lever, in particular as a pivotably mounted operator control lever. It is however also conceivable that, by means of an operator control element of the operator control unit, an electrical signal can be generated by means of which an actuator can be activated, which actuator is provided for moving the clamping element into the clamping position and/or into the release position. The operator control unit may be designed as a mechanical, and electrical and/or an electronic operator control unit, which is provided for moving the clamping element into the clamping position and/or into the release position as a result of an operator control command from an operator and/or as a result of an operator control force imparted by an operator.

The clamping unit preferably comprises at least two movably, in particular pivotably, mounted clamping elements. It is however also conceivable for the clamping unit to comprise a number of clamping elements other than two. Preferably, the at least two clamping elements have and at least substantially analogous design. Preferably, the at least two clamping elements of the clamping unit are mounted so as to be movable relative to one another, in particular pivotable relative to one another. In particular, the at least two clamping elements are movable by means of the operator control unit into a clamping position of the clamping elements and/or into a release position of the clamping elements. Preferably, the at least two clamping elements are movable jointly, in particular movable jointly into the clamping position and/or into the release position, by means of the operator control unit. It is however also conceivable for the at least two clamping elements to be movable independently of one another into the clamping position and/or into the release position by means of the operator control unit.

The quick clamping device preferably comprises at least one securing unit, in particular a self-locking unit and/or a detent unit, which is provided for preventing a movement of the clamping element from the clamping position into the release position of the clamping element, in particular aside from tolerance-induced and/or play-induced movements of the clamping element, at least in the event of the clamping element being subjected to a force which is decoupled from the operator control unit and which acts in the direction of the release position of the clamping element. The securing unit, in particular the self-locking unit and/or the detent unit, is preferably provided for substantially securing the clamping element against a movement into the release position of the clamping element proceeding from the clamping position at least in the event of the clamping element being subjected to a force which is decoupled from the operator control unit and which acts in the direction of the release position of the clamping element. The expression "for substantially securing against a movement" is to be understood in particular to mean securing of an element, in particular in one position of the element, against a movement, wherein a tolerance-induced and/or play-induced movement of the element may occur in the secured position of the element.

The clamping element can preferably be secured in the clamping position, so as to be prevented from moving into the release position of the clamping element, by the securing unit by means of a positive locking and/or non-positive locking connection in the clamping position. The securing unit is preferably at least provided for at least substantially preventing a pivoting movement of the clamping element proceeding from the clamping position into the release position of the clamping element, in particular aside from a tolerance-induced and/or play-induced pivoting movement, so as to prevent a pivoting movement of the clamping element into the release position. The securing unit may be designed as a magnetic securing unit, as a mechanical securing unit, as an electronic securing unit or the like. In the case of the securing unit being designed as a magnetic securing unit, it is conceivable for the securing unit to comprise at least one magnet element which secures the clamping element in the clamping position by means of the action of a magnetic force. In the case of the securing unit being designed as a mechanical securing unit, it is conceivable for the securing unit to comprise at least one mechanical securing element which secures the clamping element in the clamping position by means of a positively locking and/or non-positively locking connection. In the case of the securing unit being designed as an electronic securing unit, it is conceivable for the securing unit to comprise at least one electronic element which secures the clamping element in the clamping position and/or which monitors a position of the clamping element and, when the clamping position is reached, activates an actuator which secures the clamping element in the clamping position. Further embodiments of the securing unit that appear expedient to a person skilled in the art are likewise conceivable.

By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed.

It is furthermore proposed that the decoupling unit is designed such that, in a manner dependent on a rotational speed of the output shaft, a relative movement occurs between at least one decoupling element of the decoupling unit and at least one actuating element of the operator control unit for a decoupling of the operator control unit from the clamping unit. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed.

It is also proposed that the decoupling unit has at least one movably mounted decoupling element which, in a manner dependent on a rotational speed of the output shaft, can be transferred into a decoupling position in which the operator control unit is decoupled from the clamping unit. Preferably, in at least one embodiment of the decoupling unit, the decoupling element is movable relative to the actuating element owing to an action of a centrifugal force that can be caused by a rotation of the decoupling unit together with the output shaft. Preferably, the decoupling element is provided for opening up a guide recess of the transmission element, into which guide recess the actuating element can be at least partially moved, owing to an action of a centrifugal force on the decoupling element in a manner dependent on a rotational speed of the output shaft, for the purposes of movement decoupling between the operator control unit and the clamping unit. Preferably, in at least one embodiment of the decoupling unit, the decoupling element can be moved and/or braked relative to the actuating element and/or relative to the transmission element owing to an action of a friction force on the decoupling element. Preferably, the decoupling element can be guided by means of a slotted-guide element, in particular by means of a slotted-guide track, of the decoupling unit. Preferably, the slotted-guide element, in particular the slotted-guide track, is provided for permitting an idle travel of the decoupling element relative to the transmission element and/or relative to the output shaft along a direction running at least substantially parallel to the axis of rotation of the output shaft. It can advantageously be ensured that, when the output shaft is at a high rotational speed, for example when the output shaft is at a rotational speed of higher than 10,000 rpm, a reliable movement of the decoupling element about the axis of rotation of the output shaft relative to the output shaft and/or relative to the transmission element is possible. The slotted-guide element, in particular the slotted-guide track, is preferably designed such that an axial movement of the decoupling element running at least substantially parallel to the axis of rotation of the output shaft is possible before a relative rotation of the decoupling element and of the output shaft. Preferably, the decoupling element, which can be driven in rotation together with the output shaft, can be braked by means of the actuating element, in particular in order to permit a relative movement between the decoupling element and the transmission element.

Preferably, the decoupling element comprises a conical connection region which at least partially engages into a recess of the actuating element. Preferably, the decoupling unit comprises at least one decoupling spring element which acts on the decoupling element with a spring force in the direction of the actuating element. Preferably, the conical connection region is designed such that a friction moment and/or a friction force between the actuating element and the decoupling element are/is higher than a friction moment and/or a friction force between the decoupling element and the decoupling spring element. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed. It is advantageously possible for a rotation of the output shaft to be utilized for a decoupling of the operator control unit from the clamping unit in a manner dependent on a rotational speed of the drive unit.

It is furthermore proposed that the decoupling unit is designed as a centrifugal decoupling unit. Preferably, at least one decoupling element of the decoupling unit is movable owing to an action of a centrifugal force on the decoupling element that can be caused by a rotation of the decoupling unit together with the output shaft. Preferably, at least one decoupling element of the decoupling unit is movable along a direction running transversely, in particular at least substantially perpendicularly, with respect to the axis of rotation of the output shaft in a manner dependent on a rotational speed of the output shaft owing to an action of a centrifugal force that can be caused by a rotation of the decoupling unit together with the output shaft. Preferably, the decoupling unit comprises at least the decoupling spring element which is provided for moving the decoupling element, in particular after elimination of an action of a centrifugal force on the decoupling element, into a coupling position in which the operator control unit is connectable at least in terms of movement to the clamping unit. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed. It is advantageously possible for a rotation of the output shaft to be utilized for a decoupling of the operator control unit from the clamping unit in a manner dependent on a rotational speed of the drive unit.

It is furthermore proposed that the decoupling unit has at least one movably mounted decoupling element which, in a manner dependent on a rotational speed of the output shaft, is movable counter to a spring force of at least one spring element of the decoupling unit. The spring element is preferably designed as a compression spring, in particular as a helical compression spring. It is however also conceivable for the decoupling spring element to be designed as a tension spring, as a torsion spring or as some other spring element that appears expedient to a person skilled in the art. Preferably, a spring force of the spring element acts along a direction running at least substantially perpendicular to the axis of rotation, or along a direction running at least substantially parallel to the axis of rotation. Preferably, the decoupling spring element is supported with one end on the decoupling element, and the decoupling spring element is supported with a further end on the transmission element, on the output shaft, in particular on an inner side of the output shaft, or on some other element of the quick clamping device that appears expedient to a person skilled in the art. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed. It is advantageously possible to permit an automatic return of the decoupling element into a coupling position of the decoupling element.

It is also proposed that the decoupling unit comprises at least one movably mounted decoupling element, which is movable in a manner dependent on a rotational speed of the output shaft, and at least one magnet element for a restoring movement of the decoupling element into a coupling position of the decoupling element. The magnet element may be designed as a permanent magnet or as an electromagnet. The magnet element is preferably designed as a permanent magnet. The magnet element is preferably fixed to the decoupling element, in particular formed integrally with the decoupling element. "Integrally" is to be understood in particular to mean at least cohesively connected, for example by means of a welding process, an adhesive bonding process, a multi-on process and/or some other process that appears expedient to a person skilled in the art, and/or advantageously understood to mean formed in one piece, for example by production by casting and/or by production in a single-component or multi-component injection molding process, and advantageously from a single blank. The actuating element is preferably formed from a ferromagnetic material. It is however also conceivable for the magnet element to be arranged on the actuating element or on the transmission element and for the decoupling element to be formed from a ferromagnetic material. Further arrangements and/or embodiments of the magnet element that appear expedient to a person skilled in the art for a restoring movement of the decoupling element are likewise conceivable. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed.

It is furthermore proposed that the decoupling unit has at least one decoupling element which has a movable coupling projection for a connection to an actuating element of the operator control unit and/or to a transmission element of the clamping unit in a manner dependent on a rotational speed of the output shaft. Preferably, the decoupling unit comprises at least one connecting spring element which is provided for aligning the coupling projection and a main body of the decoupling element relative to one another, in particular for moving the coupling projection into a coupling position, or for connecting the coupling projection and a main body of the decoupling element in pressure-resistant fashion for a transmission of pressure forces, in particular in a manner dependent on a rotational speed of the output shaft. The connecting element is preferably designed as a torsion spring, in particular as a leg spring. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed. It is advantageously possible to realize a particularly compact design of the decoupling unit which requires little structural space.

Furthermore, in particular in an alternative embodiment of the quick clamping device, it is proposed that the decoupling unit is designed as a friction-type decoupling unit. The decoupling unit preferably comprises at least one clutch element, in particular a friction clutch element which opens in a manner dependent on a rotational speed of the output shaft, or the decoupling element with the conical connection region, by means of which the operator control unit can be decoupled from the clamping unit in a manner dependent on a rotational speed of the output shaft. Preferably, the decoupling unit is provided for decoupling the operator control unit from the output shaft of the clamping unit in a manner dependent on a rotational speed of the output shaft owing to a separation of a friction pairing between the actuating element and the transmission element, or decoupling the operator control unit from the clamping unit in a manner dependent on a rotational speed of the output shaft owing to the production of a friction pairing between the actuating element and the decoupling element, in particular owing to a relative movement, which can be caused as a result of the production of the friction pairing, between the actuating element and the decoupling element or between the decoupling element and the transmission element. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed.

It is also proposed that the decoupling element has at least one movably mounted decoupling element which is movable relative to the output shaft owing to a friction force between the decoupling element and an actuating element of the operator control unit. The actuating element may be designed as a clutch, as a braking bolt, as an unstable element with an elastically or articulatedly movable subregion or the like. Preferably, the operator control unit is decouplable from the clamping unit owing to a relative movement of the decoupling element relative to the output shaft in a manner dependent on a rotational speed of the output shaft. Preferably, the coupling element comprises a conical connecting region which engages at least partially into a recess of the actuating element. The conical connecting region is preferably designed as a conical tip of the decoupling element. It is alternatively also conceivable for the decoupling element to have a latching geometry, such as for example a toothing, a cam geometry or the like, and for the actuating element to have corresponding latching geometry, in order to realize a relative movement of the decoupling element owing to an interaction between the actuating element and the decoupling element. The decoupling unit preferably comprises at least one decoupling spring element which acts on the decoupling element with a spring force in the direction of the actuating element. Preferably, the conical connecting region is designed such that a friction moment and/or a friction force between the actuating element and the decoupling element are/is higher than a friction moment and/or a friction force between the decoupling element and the decoupling spring element. Preferably, the decoupling spring element has a maximum spring force which is in particular less than 10 N, preferably less than 5 N and particularly preferably less than 2 N. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed. It is possible in a simple manner in terms of construction, owing to an action of a friction force, for a relative movement between the decoupling element and the output shaft for the purposes of decoupling of the operator control unit from the clamping unit to be made possible in a manner dependent on a rotational speed of the output shaft.

It is furthermore proposed that the decoupling unit comprises at least one movably mounted decoupling element and at least one decoupling spring element which acts on the decoupling element with a spring force in the direction of the operator control unit. Preferably, the decoupling spring element acts on the decoupling element in the direction of a coupling position of the decoupling element. The decoupling spring element is preferably arranged in a guide recess of the transmission element. Preferably, the decoupling spring element is supported with at least one end on the decoupling element, and the decoupling spring element is supported with at least one further end on the transmission element, in particular on an inner side of the transmission element. The decoupling spring element is preferably designed as a compression spring, in particular as a helical compression spring. It is however also conceivable for the decoupling spring element to be of some other design that appears expedient to a person skilled in the art. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed. It is advantageously possible to permit an automatic return of the decoupling element into a coupling position of the decoupling element.

It is furthermore proposed that the decoupling unit has at least one movably mounted decoupling element and at least one slotted-guide element for guiding the decoupling element during a relative movement of the decoupling element with respect to the output shaft. The slotted-guide element is preferably designed as a slotted-guide track. The slotted-guide element is preferably arranged on the transmission element. A guide bolt, arranged on the decoupling element, of the decoupling unit preferably engages into the slotted-guide element. It is however also conceivable for the decoupling element to have at least one projection which is formed integrally with the decoupling element and which engages into the slotted-guide element for the purposes of guiding the decoupling element. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed.

It is advantageously possible to permit a reliable transfer of the decoupling element into a decoupling position.

It is also proposed that the decoupling element has at least one movably mounted decoupling element which is mounted so as to be movable in the output shaft along and/or around an axis of rotation of the output shaft. The axis of rotation of the output shaft runs preferably at least substantially parallel, in particular coaxially, with respect to the clamping axis of the clamping unit. The axis of rotation of the output shaft runs preferably transversely, in particular at least substantially perpendicularly, with respect to a drive axis, in particular a rotor axis, of a drive unit of the portable power tool. Here, "substantially parallel" is to be understood to mean an orientation of a direction relative to a reference direction, in particular in one plane, wherein the direction has a deviation relative to the reference direction of in particular less than 8°, advantageously less than 5° and particularly advantageously less than 2°. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed. It is advantageously possible to realize a particularly compact design of the quick clamping device according to the invention.

It is also proposed that the decoupling unit has at least one output element which is provided for outputting at least a functional state of the decoupling unit to an operator. The output element may be designed as a mechanical element, as an electronic element or as an electric element. The output element is preferably provided for outputting a functional state of the securing unit to an operator by haptic, acoustic and/or optical means. The functional state of the decoupling unit preferably describes a state of the decoupling unit such as for example a coupled or decoupled state of the operator control unit with respect to the clamping unit, a defect of the decoupling unit or other states of the decoupling unit that appear expedient to a person skilled in the art. The output element may be designed as a display, as a single light source, such as for example an LED, as a mechanically movable display element, as a loudspeaker or the like. By means of the embodiment according to the invention of the quick clamping device, it is advantageously possible to realize a high level of operator safety. It is advantageously possible, when the output shaft is at a high rotational speed, in particular at a rotational speed of the output shaft of higher than 1000 rpm, for a movement of the clamping element resulting from an actuation of the operator control unit to be prevented, in order to prevent a release of the insert tool unit from the clamping unit and/or from the output shaft while the output shaft is rotating at a high rotational speed. It can advantageously be ensured that a transfer of the quick clamping device, in particular of the clamping element of the clamping unit of the quick clamping device, into a release position can be prevented when the output shaft is at a high rotational speed. It is advantageously possible to signal to an operator whether the operator control unit is reliably decoupled from the clamping unit by means of the decoupling unit or whether a defect of the decoupling unit is present.

Also proposed is a portable power tool, in particular an angle grinder, having a quick clamping device according to the invention. Here, a "portable power tool" is to be understood in particular to mean a power tool for machining workpieces, which power tool can be transported by an operator without using a transport machine. The portable power tool has in particular a mass of less than 40 kg, preferably less than 10 kg and particular preferably less than 5 kg. The portable power tool is particularly preferably designed as an angle grinder. It is however also conceivable for the portable power tool to be of some other design that appears expedient to a person skilled in the art, for example designed as a circular saw, as a grinder or the like. The portable power tool preferably comprises an output shaft that can be driven in rotation. The quick clamping device is preferably arranged on the output shaft. The quick clamping device is preferably arranged at least partially in the output shaft. The output shaft is preferably designed as a hollow shaft. In particular, the portable power tool forms a power tool system together with an insert tool unit that can be fixed by means of the quick clamping device to the output shaft. By means of the embodiment according to the invention of the quick clamping device, it is advantageously possible to realize a high level of operator safety. It can advantageously be ensured that a transfer of the quick clamping device, in particular of the clamping element of the clamping unit of the quick clamping device, into a release position can be prevented when the output shaft is at a high rotational speed.

Here, it is not the intention for the quick clamping device according to the invention and/or the portable power tool according to the invention to be restricted to the use and embodiment described above. In particular, the quick clamping device according to the invention and/or the portable power tool according to the invention may, in order to perform a function described herein, have a number of individual elements, components and units and method steps that deviates from a number stated herein. Furthermore, where value ranges are stated in this disclosure, it is also the intention for values lying within the stated limits to be disclosed and usable as desired.

BRIEF DESCRIPTION OF THE DRAWINGS

Further advantages will emerge from the following description of the drawing. The drawing illustrates exemplary embodiments of the invention. The drawing, the description and the claims contain numerous features in combination. A person skilled in the art will expediently also consider the features individually and combine them to form meaningful further combinations.

In the drawing.

DETAILED DESCRIPTION

Figure 1:
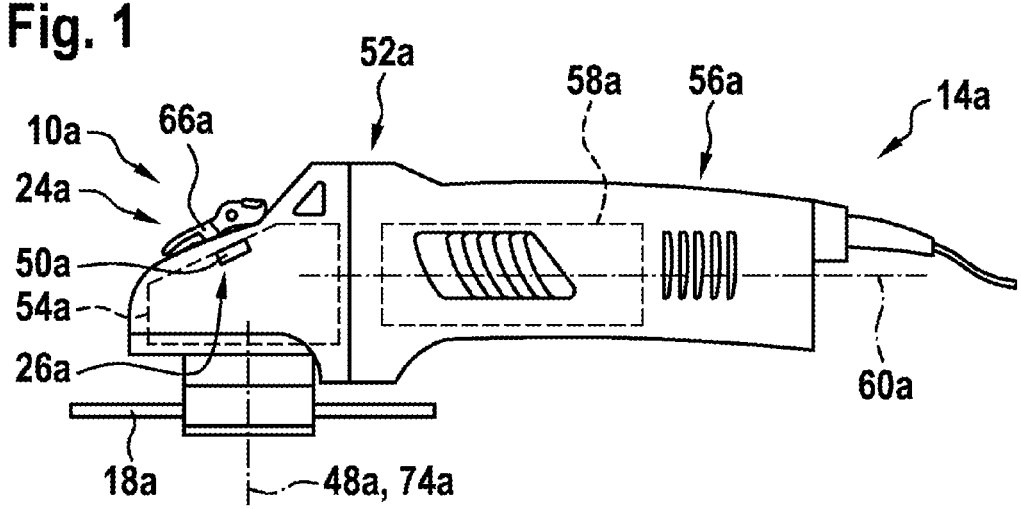
FIG. 1 shows a portable power tool according to the invention having a quick clamping device according to the invention in a schematic illustration.
Figure 2:
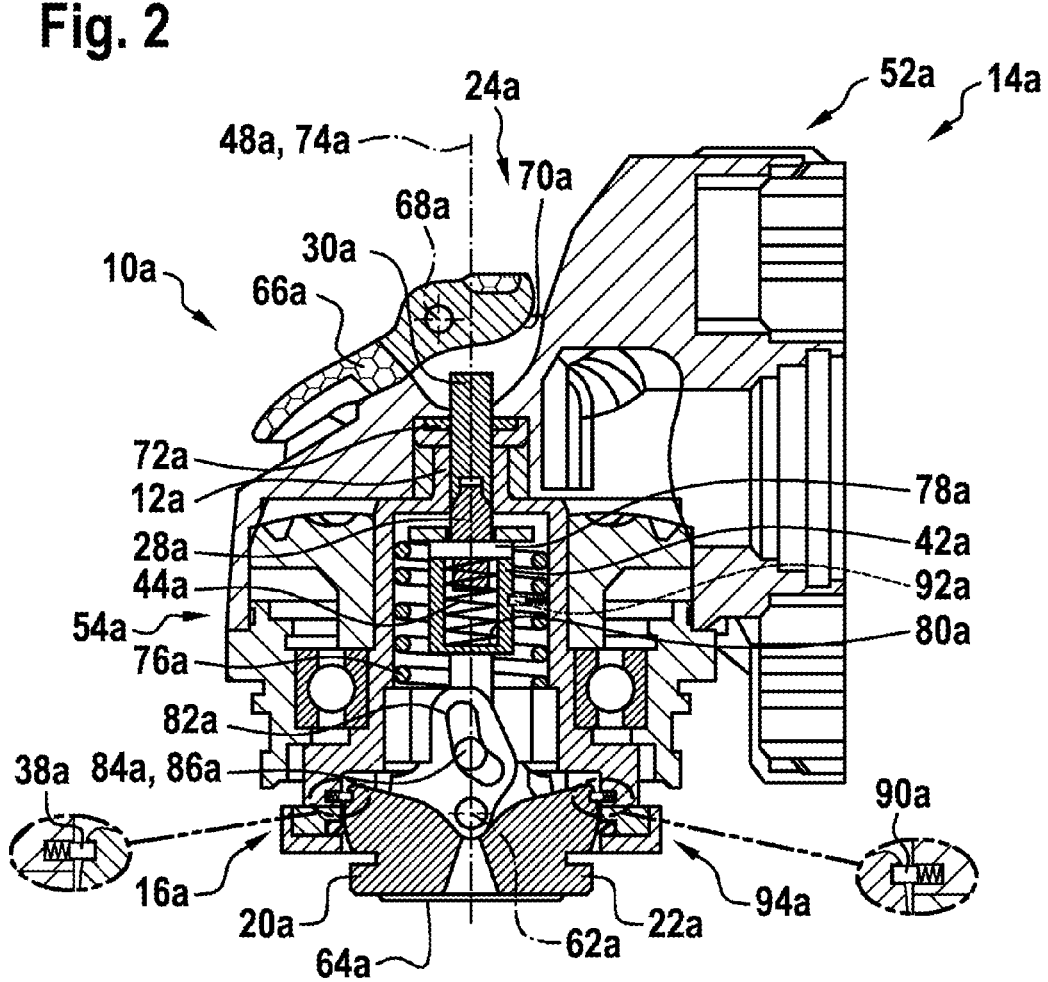
FIG. 2 shows a sectional view of the portable power tool according to the invention and of the quick clamping device according to the invention in a schematic illustration.

FIG. 1 shows a portable power tool 14a which is designed as an angle grinder and which has a quick clamping device 10a. It is however also conceivable for the portable power tool 14a to be of some other design that appears expedient to a person skilled in the art, for example designed as a circular saw, as a grinder or the like. The portable power tool 14a comprises a gearing housing 52a for accommodating and/or for the mounting of a gearing unit 54a of the portable power tool 14a. The gearing housing 52a is preferably formed from a metallic material. It is however also conceivable for the gearing housing 52a to be formed from some other material that appears expedient to a person skilled in the art, for example from plastic or the like. The gearing unit 54a is preferably designed as an angle gearing. The gearing unit 54a comprises in particular an output shaft 12a which can be driven in rotation and to which an insert tool unit 18a can be fixed, in particular by means of the quick clamping device 10a. The output shaft 12a is preferably designed as a hollow spindle, in which the quick clamping device 10a is at least partially arranged (FIG. 2). A protective cover unit (not illustrated in any more detail here) can be arranged, in a manner already known to a person skilled in the art, on the gearing housing 52a. An auxiliary handle (not illustrated in any more detail here) can be arranged, in a manner already known to a person skilled in the art, on the gearing housing 52a. The portable power tool 14a comprises a motor housing 56a for accommodating and/or for the mounting of a drive unit 58a of the portable power tool 14a. The drive unit 58a is preferably provided, in a manner already known to a person skilled in the art, for driving the output shaft 12a in rotation about an axis of rotation 48a of the output shaft 12a by interaction with the gearing unit 54a. The axis of rotation 48a of the output shaft 12a runs at least substantially perpendicular to a drive axis 60a of the drive unit 58a. The drive unit 58a is preferably designed as an electric motor unit. It is however also conceivable for the drive unit 58a to be of some other design that appears expedient to a person skilled in the art, for example designed as a combustion-type drive unit, as a hybrid drive unit, as a pneumatic drive unit or the like.

FIG. 2 shows a sectional view of the portable power tool 14a, in particular in the region of the gearing housing 52a, and of the quick clamping device 10a. The quick clamping device 10a for the portable power tool 14a, which has at least the output shaft 12a that can be driven in rotation, comprises at least one clamping unit 16a, which, for tool-free fixing of the insert tool unit 18a to the output shaft 12a, has at least one movably mounted clamping element 20a, 22a for the action of a clamping force on the insert tool unit 18a in a clamping position of the clamping element 20a, 22a. Furthermore, the quick clamping device 10a comprises at least one operator control unit 24a for moving the clamping element 20a, 22a into the clamping position and/or into a release position of the clamping element 20a, 22a, in which the insert tool unit 18a is removable from the clamping unit 16a and/or from the output shaft 12a. The clamping unit 16a comprises at least two movably mounted clamping elements 20a, 22a. It is however also conceivable for the clamping unit 16a to comprise a number of clamping elements 20a, 22a other than two. The at least two clamping elements 20a, 22a have an at least substantially analogous design, such that features disclosed with regard to one of the clamping elements 20a, 22a are to be regarded as likewise been disclosed for the further clamping element 20a, 22a. The at least two clamping elements 20a, 22a are pivotably mounted. A pivot axis 62a of the at least two clamping elements 20a, 22a runs at least substantially perpendicular to the axis of rotation 48a of the output shaft 12a. The at least two clamping elements 20a, 22a are provided for fixing the insert tool unit 18a, in a state in which it is arranged on the clamping unit 16a and/or the output shaft 12a, axially on the output shaft 12a, in particular in the clamping position of the at least two clamping elements 20a, 22a. The at least two clamping elements 20a, 22a are connected rotationally conjointly to the output shaft 12a. The at least two clamping elements 20a, 22a can be driven in rotation about the axis of rotation 48a together with the output shaft 12a.

The clamping unit 16a comprises, for a transmission of torque to the insert tool unit 18a, at least one rotary driving element 64a. The rotary driving element 64a, in a state in which it is arranged on the clamping unit 16a and/or the output shaft 12a, engages into a receiving recess (not illustrated in any more detail here) of the insert tool unit 18a and, for a transmission of torque, bears against at least one edge, which delimits the receiving recess, of the insert tool unit 18a. A transmission of torque between the output shaft 12a and the insert tool unit 18a arranged on the clamping unit 16a and/or the output shaft 12a is preferably realized, in a manner already known to a person skilled in the art, by means of a positive locking connection between the rotary driving element 64a and the insert tool unit 18a. The rotary driving element is arranged rotationally conjointly on the output shaft 12a. The rotary driving element 64a can be driven in rotation about the axis of rotation 48a together with the output shaft 12a.

The operator control unit 24a is preferably provided for moving the clamping element 20a, 22a, in particular the at least two clamping elements 20a, 22a, at least into the release position, in which the insert tool unit 18a is removable from the clamping unit 16a and/or from the output shaft 12a. Alternatively or in addition, it is conceivable for the operator control unit 24a to be provided for moving the clamping element 20a, 22a, in particular the at least two clamping elements 20a, 22a, at least into the clamping position, in which the insert tool unit 18a is fixable by means of the clamping unit 16a to the output shaft 12a. The operator control unit 24a preferably comprises at least one operator control element 66a, which is actuatable by an operator. The operator control element 66a is designed as an operator control lever. The operator control element 66a comprises a movement axis 68a, in particular a pivot axis, which runs transversely, in particular at least substantially perpendicularly, with respect to the axis of rotation 48a of the output shaft 12a. The operator control element 66a is preferably mounted so as to be pivotable about the movement axis 68a, in particular pivot axis. The operator control element 66a is decoupled from a rotational movement of the output shaft 12a. The operator control element 66a comprises an eccentric portion 70a for an actuation of the actuating element 30a of the operator control unit 24a. The actuating element 30a is mounted so as to be movable in translational fashion along the axis of rotation 48a, in particular in the output shaft 12a and/or in the gearing housing 52a. The actuating element 30a is fixed in the gearing housing 52a so as to be prevented from rotating relative to the gearing housing 52a, in particular owing to at least one lateral flattened portion of the actuating element 30a, which permits an axial movement and prevents a rotational movement. Preferably, the actuating element 30a has in each case at least one flattened portion at two mutually averted sides of the actuating element 30a. It is however also conceivable for the actuating element 30a to be of some other design that appears expedient to a person skilled in the art, for example to have a polygonal cross section, a toothing or the like, which is provided for securing the actuating element 30a against rotation relative to the gearing housing 52a. In the region of the actuating element 30a, there is preferably arranged a seal element 72a, for example a rubber seal or the like, in particular for at least substantially preventing an ingress of dirt into the gearing housing 52a and/or into the clamping unit 16a. The seal element 72a preferably bears against the actuating element 30a. The actuating element 30a is in particular mounted so as to be movable relative to the seal element 72a. The actuating element 30a slides on at least one sealing surface of the seal element 72a during a movement relative to the seal element 72a.

The quick clamping device 10a comprises at least one decoupling unit 26a which is provided for decoupling the operator control unit 24a from the clamping unit 16a in a manner dependent on a rotational speed of the output shaft 12a. The decoupling unit 26a is designed such that a relative movement occurs between at least one decoupling element 28a of the decoupling unit 26a and at least the actuating element 30a of the operator control unit 24a, for the purposes of decoupling of the operator control unit 24a from the clamping unit 16a, in a manner dependent on a rotational speed of the output shaft 12a. The decoupling unit 26a comprises at least the movably mounted decoupling element 28a which can be transferred into a decoupling position, in which the operator control unit 24a is decoupled from the clamping unit 16a, in a manner dependent on a rotational speed of the output shaft 12a. The decoupling unit 26a is preferably designed as a friction-type decoupling unit. The decoupling unit 26a has at least the movably mounted decoupling element 28a, which is movable relative to the output shaft 12a owing to a friction force between the decoupling element 28a and the actuating element 30a of the operator control unit 24a. The decoupling unit 26a has at least the movably mounted decoupling element 28a, which is mounted in the output shaft 12a so as to be movable along and/or around the axis of rotation 48a of the output shaft 12a. The decoupling unit 26a comprises at least the movably mounted decoupling element 28a and at least one decoupling spring element 44a, which acts on the decoupling element 28a with a spring force in the direction of the operator control unit 24a. The decoupling unit 26a has at least the movably mounted decoupling element 28a and at least one slotted-guide element 46a for guiding the decoupling element 28a during a relative movement of the decoupling element 28a with respect to the output shaft 12a.

The decoupling element 28a can be placed in contact with the actuating element 30a by means of a non-positively locking connection, or the decoupling element 28a is in contact with the actuating element 30a by means of a non-positively locking connection. The decoupling element 28a is preferably mounted, in particular in the output shaft 12a or in a transmission element 42a of the clamping unit 16a, so as to be movable in translational fashion along the axis of rotation 48a. The decoupling element 28a comprises in particular a conical connection region which engages at least partially into a recess of the actuating element 30a. A friction action between the actuating element 30a and the decoupling element 28a is in particular dependent on a design of the conical connecting region and on a spring force of the decoupling spring element 44a. The decoupling spring element 44a is provided for acting on the decoupling element 28a with a spring force in the direction of the actuating element 30a. The decoupling spring element 44a is arranged in the transmission element 42a of the clamping unit 16a. The transmission element 42a is designed as a clamping fork. The transmission element 42a is connected rotationally conjointly to the output element 12a. The transmission element 42a is movable in translational fashion along a clamping axis 74a of the clamping unit 16a. The transmission element 42a is mounted movably in the output shaft 12a. The transmission element 42a can, at least by means of a clamping spring element 76a of the clamping unit 16a, be acted on with a spring force along the clamping axis 74a, in particular in the direction of the operator control unit 24a.

Figure 3:
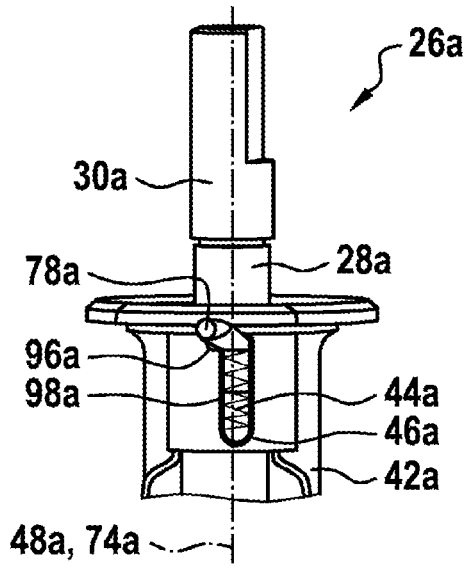
FIG. 3 shows a detail view of a decoupling unit of the quick clamping device according to the invention in a schematic illustration.

The decoupling unit 26a has at least one connecting element 78a which is provided for connecting the decoupling element 28a and the transmission element 42a to one another in terms of movement, in particular at least in a state of the output shaft 12a at a low rotational speed or when the output shaft 12a is at a standstill. The connecting element 78a is designed as a bolt. The connecting element 78a is arranged on, in particular fixed to, the decoupling element 28a. The connecting element 78a is movable together with the decoupling element 28a. The connecting element 78a extends into the slotted-guide element 46a of the decoupling unit 26a (FIG. 3). The slotted-guide element 46a is designed as a slotted-guide track. The slotted-guide element 46a is arranged on the transmission element 42a, in particular is formed integrally with the transmission element 42a. During a rotational movement of the output shaft 12a, the decoupling element 28a and the connecting element 78a are rotatable relative to the transmission element 42a owing to a braking action resulting from an actuation of the actuating element 30a, wherein the connecting element 78a is movable in the slotted guide element 46a, formed as slotted-guide track, such that the decoupling element 28a is movable counter to a spring force of the decoupling spring element 44a into a guide recess 80a of the transmission element 42a. An actuation of the operator control element 66a during a rotational movement of the output shaft 12a can be converted into a movement of the actuating element 30a and of the decoupling element 28a relative to the transmission element 42a. A movement of the transmission element 42a resulting from an action of an operator control force by means of the operator control unit 24a for the purposes of transferring the clamping element 20a, 22a, in particular the clamping elements 20a, 22a, from the clamping position into the release position can be substantially prevented during a rotational movement of the output shaft 12a. When the output shaft 12a is at a low rotational speed or when the output shaft 12a is at a standstill, an axial force exerted by the actuating element 30a on the decoupling element 28a can be transmitted to the transmission element 42a by means of an interaction of the connecting element 78a and the slotted-guide element 46a designed as slotted-guide track. The transmission element 42a is movable by means of the operator control unit 24a counter to a spring force of the clamping spring element 76a. The transmission element 42a is provided for moving the clamping element 20a, 22a, in particular the clamping elements 20a, 22a, from the clamping position into the release position.

FIG. 3 shows a detail view of the decoupling unit 26a. The actuating element 30a is illustrated in a non-actuated state. The decoupling element 28a is illustrated in a state of the decoupling element 28a in which it is bearing against the transmission element 42a by means of the decoupling spring element 44a. In the event of a rotation of the output shaft 12a together with the transmission element 42a and the decoupling unit 26a, the decoupling element 28a and the transmission element 42a are rotatable relative to the actuating element 30a. In the event of a movement of the actuating element 30a owing to an action of a force exerted by operator on the operator control element 66a, the actuating element 30a can be pressed against the decoupling element 28a, which can be driven in rotation together with the output shaft 12a. In the event of a rotation of the decoupling element 28a together with the output shaft 12a, a rotational movement of the decoupling element 28a can be braked, in particular in a manner dependent on a rotational speed of the output shaft 12a, owing to an action of a friction force of the actuating element 30a on the decoupling element 28a. The decoupling element 28a can be rotated relative to the transmission element 42a, in particular about the axis of rotation 48a of the output shaft 12a, owing to an interaction of the slotted-guide element 46a and of the connecting element 78a. The decoupling element 28a is movable, in particular rotatable, relative to the transmission element 42a and/or relative to the output shaft 12a about the axis of rotation 48a. The connecting element 78a is movable, proceeding from a slotted-guide track portion 96a of the slotted-guide element 46a running transversely with respect to the axis of rotation 48a, into a further slotted-guide track portion 98a of the slotted-guide element 46a running at least substantially parallel to the axis of rotation 48a. The slotted-guide track portion 96a of the slotted-guide element 46a is designed such that a movement of the connecting element 78a along a direction running at least substantially parallel to the axis of rotation 48a over a distance of in particular at least 1 mm, preferably of at least 2 mm and particular preferably of more than 1 mm and less than 10 mm, can be made possible within the slotted-guide track portion 96a of the slotted-guide element 46a running transversely with respect to the axis of rotation 48a. By means of this embodiment of the slotted-guide element 46a, it can advantageously be ensured that, in the event of a rotation of the output shaft 12a at a high rotational speed, a reliable transfer of the connecting element 78a into the further slotted-guide track portion 98a of the slotted-guide element 46a can be realized.

Owing to an arrangement of the connecting element 78a in the further slotted-guide track portion 98a of the slotted-guide element 46a, the decoupling element 28a is arranged in a decoupling position of the decoupling element 28a. Owing to an arrangement of the connecting element 78a in the further slotted-guide track portion 98a of the slotted-guide element 46a, the decoupling element 28a is movable counter to a spring force of the decoupling spring element 44a. Owing to an action of a force exerted by an operator by means of the actuating element 30a, the decoupling element 28a is movable along the axis of rotation 48a relative to the transmission element 42a and/or relative to the output shaft 12a, in particular is movable at least partially into the guide recess 80a of the transmission element 42a. The transmission element 42a preferably has, on a side of the transmission element 42a facing toward the clamping element 20a, 22a, in particular the clamping elements 20a, 22a, a dirt discharge opening (not illustrated in any more detail here) by means of which dirt and/or abraded material situated in the guide recess 80a can be discharged out of the guide recess 80a and/or out of the slotted-guide element 46a. It is advantageously possible for reliable operation of the decoupling unit 26a to be made possible.

Owing to a relative movement of the decoupling element 28a and of the actuating element 30a being made possible along the axis of rotation 48a relative to the transmission element 42a and/or relative to the output shaft 12a, the operator control unit 24a is decoupled from the clamping unit 16a, in particular in a manner dependent on a rotational speed of the output shaft 12a. When the output shaft 12a is at a low rotational speed, in particular when the output shaft 12a is at a low rotational speed or the output shaft 12a is at a standstill and in the case of the transmission element 42a, a relative movement of the decoupling element 28a about the axis of rotation 48a owing to a friction force between the actuating element 30a and the decoupling element 28a can be at least substantially prevented, such that the connecting element 78a is arranged in the slotted-guide track portion 96a of the slotted-guide element 46a and an action of a force exerted by an operator by means of the actuating element 30a can be transmitted from the decoupling element 28a to the transmission element 42a. The operator control unit 24a is coupled to the clamping unit 16a. The clamping element 20a, 22a, in particular the clamping elements 20a, 22a, are movable into the release position by means of the operator control unit 24a.

The clamping element 20a, 22a, in particular the clamping elements 20a, 22a, is/are mounted movably, in particular pivotably, on the output shaft 12a, in particular in the output shaft 12a. The pivot axis 62a of the clamping element 20a, 22a, in particular of the clamping elements 20a, 22a, runs preferably at least substantially perpendicular to the clamping axis 74*a* of the clamping unit 16*a*. The clamping element 20*a*, 22*a*, in particular the clamping elements 20*a*, 22*a*, has/have at least one motion slotted-guide element 82*a* which is provided for interacting with a slotted-guide engagement element 84*a* of the clamping unit 16*a*. The slotted-guide engagement element 84*a* is fixed to the transmission element 42*a*. The slotted-guide engagement element 84*a* is designed as a bolt, which is fixed to the transmission element 42*a*, in particular between two fork ends of the transmission element 42*a*. Owing to an interaction of the slotted-guide engagement element 84*a* and of the motion slotted-guide element 82*a*, the clamping element 20*a*, 22*a*, in particular the clamping elements 20*a*, 22*a*, is/are movable from the clamping position into the release position or from the release position into the clamping position. The clamping element 20*a*, 22*a*, in particular the clamping elements 20*a*, 22*a*, is/are in particular movable from the release position into the clamping position by means of an action of a spring force of the clamping spring element 76*a* on the transmission element 42*a*. The clamping element 20*a*, 22*a*, in particular the clamping elements 20*a*, 22*a*, is/are movable into the clamping position automatically, in particular after withdrawal of an action of a force exerted by an operator by means of the operator control unit 24*a*, owing to an action of a spring force of the clamping spring element 76*a*.

The quick clamping device 10*a* comprises at least one securing unit 94*a*, in particular a self-locking unit and/or a detent unit, which is provided for preventing a movement of the clamping element 20*a*, 22*a*, in particular of the clamping elements 20*a*, 22*a*, from the clamping position into the release position of the clamping element 20*a*, 22*a*, in particular of the clamping elements 20*a*, 22*a*, at least in the event of the clamping element 20*a*, 22*a*, in particular the clamping elements 20*a*, 22*a*, being acted on by a force which is decoupled from the operator control unit 24*a* and which acts in the direction of the release position of the clamping element 20*a*, 22*a*, in particular of the clamping elements 20*a*, 22*a*. The securing unit 94*a* has at least one movably mounted positive locking and/or non-positive locking element 86*a*, 88*a*, 90*a*, 92*a* which, at least in the clamping position of the clamping element 20*a*, 22*a*, in particular of the clamping elements 20*a*, 22*a*, engages at least partially into the clamping element 20*a*, 22*a*, in particular the clamping elements 20*a*, 22*a*, and/or into the transmission element 42*a*, which interacts with the clamping element 20*a*, 22*a*, in particular with the clamping elements 20*a*, 22*a*, of the clamping unit 16*a*, in order to secure the clamping element 20*a*, 22*a*, in particular the clamping elements 20*a*, 22*a*, against a movement into the release position of the clamping element 20*a*, 22*a*, in particular of the clamping elements 20*a*, 22*a*. One of the positive locking and/or non-positive locking elements 86*a*, 88*a*, 90*a*, 92*a* is formed by the slotted-guide engagement element 84*a* (FIG. 2).

Preferably, in a clamping position of the clamping element 20*a*, 22*a*, in particular of the clamping elements 20*a*, 22*a*, by means of an interaction of the motion slotted-guide element 82*a* with the positive locking and/or non-positive locking element 86*a* designed as slotted-guide engagement element 84*a*, when the clamping element 20*a*, 22*a*, in particular the clamping elements 20*a*, 22*a*, are acted on by a force which is decoupled from the operator control unit 24*a* and which acts in the direction of the release position of the clamping element 20*a*, 22*a*, in particular of the clamping elements 20*a*, 22*a*, a main securing force running at least substantially perpendicular to the axis of rotation 48*a* can be exerted on the clamping element 20*a*, 22*a*, in particular on the clamping elements 20*a*, 22*a*. Preferably, in a clamping position of the clamping element 20*a*, 22*a*, in particular of the clamping elements 20*a*, 22*a*, by means of an interaction of the motion slotted-guide element 82*a* with the positive locking and/or non-positive locking element 86*a* designed as slotted-guide engagement element 84*a*, when the clamping element 20*a*, 22*a*, in particular the clamping elements 20*a*, 22*a*, are acted on by a force which is decoupled from the operator control unit 24*a* and which acts in the direction of the release position of the clamping element 20*a*, 22*a*, a movement capability of the clamping element 20*a*, 22*a*, in particular of the clamping elements 20*a*, 22*a*, into the release position can be substantially blocked.

Alternatively or in addition, the securing unit 94*a* comprises at least one further positive locking and/or non-positive locking element 88*a*, 90*a*, which is designed as a detent element and which is provided for engaging into the clamping element 20*a*, 22*a*, in particular in the clamping position of the clamping element 20*a*, 22*a* (FIG. 2). The securing unit 94*a* preferably alternatively or additionally comprises at least two further positive locking and/or non-positive locking elements 88*a*, 90*a* formed as detent elements, wherein in each case one engages into one of the clamping elements 20*a*, 22*a*, in particular in the clamping position of the clamping elements 20*a*, 22*a*. The further positive locking and/or non-positive locking elements 88*a*, 90*a* are designed as movably mounted detent elements. The further positive locking and/or non-positive locking elements 88*a*, 90*a* are mounted so as to be movable, in particular movable in translational fashion, along a direction running at least substantially perpendicular to the axis of rotation 48*a* and/or to the clamping axis 74*a*. The axis of rotation 48*a* and the clamping axis 74*a* preferably run at least substantially parallel, in particular, axially, with respect to one another. The securing unit 94*a* preferably alternatively or additionally comprises an additional positive locking and/or non-positive locking element 92*a*, which is provided for engaging into the transmission element 42*a*, in particular in a clamping position of the clamping elements 20*a*, 22*a*, and/or in an end position, moved by means of a spring force of the clamping spring element 76*a*, of the transmission element 42*a*. The additional positive locking and/or non-positive locking element 92*a* is designed as a movably mounted detent element. The additional positive locking and/or non-positive locking element 92*a* is mounted so as to be movable, in particular movable in translational fashion, along a direction running at least substantially perpendicular to the axis of rotation 48*a* and/or to the clamping axis 74*a*.

The decoupling unit 26*a* has at least one output element 50*a* which is provided for outputting at least a functional state of the decoupling unit 26*a* to an operator. The output element 50*a* may be designed as a mechanical element, as an electronic element or as an electrical element. The output element 50*a* is preferably provided for outputting a functional state of the decoupling unit 26*a* by haptic, acoustic and/or optical means. The functional state of the decoupling unit 26*a* preferably describes a state of the decoupling unit 26*a* such as for example a coupled or decoupled state of the operator control unit 24*a* with respect to the clamping unit 16*a*, a defect of the decoupling unit 26*a* or other states of the decoupling unit 26*a* that appear expedient to a person skilled in the art. The output element 50*a* may be designed as a display, as a single light source, such as for example an LED, as a mechanically movable display element, as a loudspeaker or the like. Furthermore, the output element 50*a* may be provided for outputting at least a functional state of the securing unit 94a to an operator.

FIGS. 4 to 17 show further exemplary embodiments of the invention. The following descriptions and the drawings are restricted substantially to the differences between the exemplary embodiments, wherein, with regard to components of identical designation, in particular with regard to components with the same reference designations, reference may basically also be made to the drawings and/or the description of the other exemplary embodiments, in particular of FIGS. 1 to 3. To distinguish between the exemplary embodiments, the alphabetic character a has been added as a suffix to the reference designations of the exemplary embodiment in FIGS. 1 to 3. In the exemplary embodiments of FIGS. 4 to 17, the alphabetic character a has been replaced by the alphabetic characters b to n.

Figure 4:
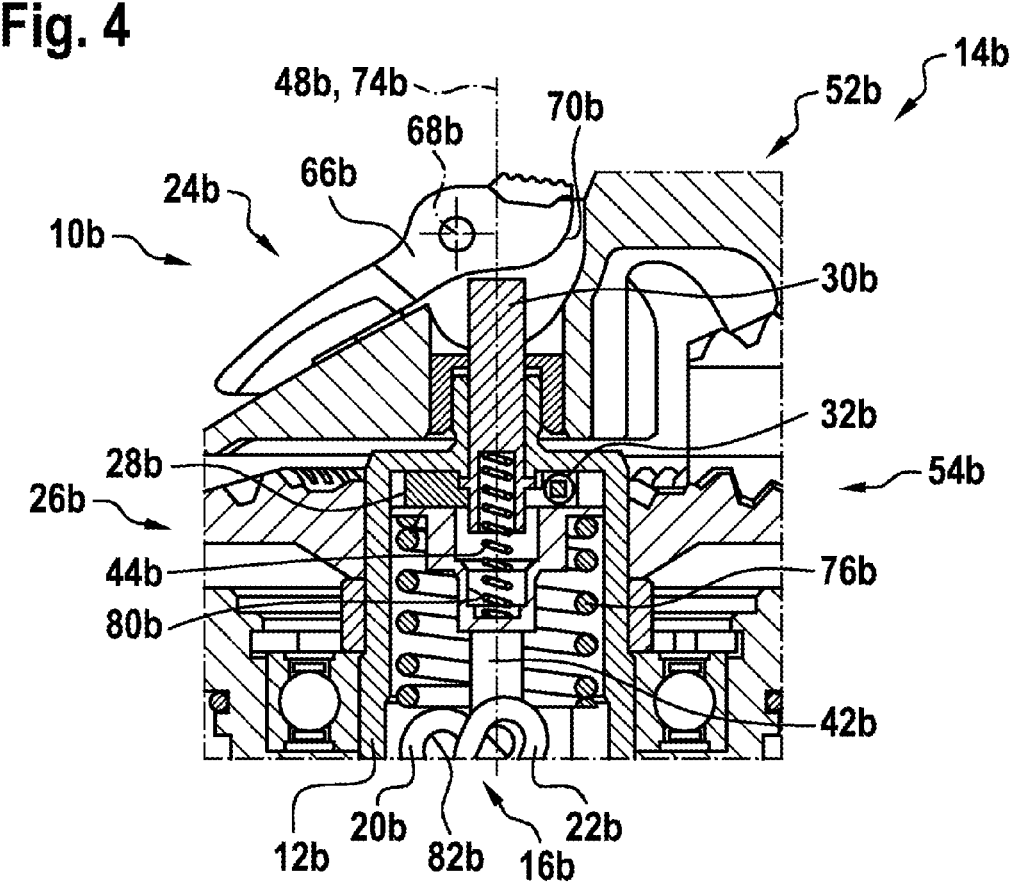
FIG. 4 shows a sectional view of an alternative portable power tool according to the invention and of an alternative quick clamping device according to the invention having an alternative decoupling unit in a schematic illustration.

FIG. 4 shows a sectional view of an alternative portable power tool 14b and of an alternative quick clamping device 10b. The portable power tool 14b illustrated in FIG. 4 has an at least substantially analogous design in relation to the portable power tool 14a described in the description relating to FIGS. 1 to 3. The quick clamping device 10b for the portable power tool 14b, which has at least the output shaft 12b that can be driven in rotation, comprises at least one clamping unit 16b, which, for tool-free fixing of the insert tool unit (not illustrated in any more detail here) to the output shaft 12b, has at least one movably mounted clamping element 20b, 22b, in particular at least two movably mounted clamping elements 20b, 22b, for the action of a clamping force on the insert tool unit 18b in a clamping position of the clamping element 20b, 22b.

Furthermore, the quick clamping device 10b comprises at least one operator control unit 24b for moving the clamping element 20b, 22b into the clamping position and/or into a release position of the clamping element 20b, 22b, in which the insert tool unit 18b is removable from the clamping unit 16b and/or from the output shaft 12b. The operator control unit 24b comprises at least one movably mounted operator control element (not illustrated in any more detail here) which is provided for acting on an actuating element 30b of the operator control unit 24b in order to move the clamping element 20b, 22b into the clamping position and/or into a release position. The actuating element 30b is connected rotationally conjointly to the output shaft 12b and is mounted so as to be movable in translational fashion in the output shaft 12b.

Furthermore, the quick clamping device 10b comprises at least one decoupling unit 26b which is provided for decoupling the operator control unit 24b from the clamping unit 16b in a manner dependent on a rotational speed of the output shaft 12b. The decoupling unit 26b is designed as a centrifugal decoupling unit. The decoupling unit 26b comprises at least one movably mounted decoupling element 28b, which is movable counter to a spring force of at least one spring element 32b of the decoupling unit 26b in a manner dependent on a rotational speed of the output shaft 12b. The decoupling element 28b is preferably movable about an axis running substantially parallel to an axis of rotation 48b of the output shaft 12b, counter to a spring force of the spring element 32b, owing to an action of a centrifugal force that can be caused by the rotation of the output shaft 12b and exerted on the decoupling element 28b.

Figure 5:
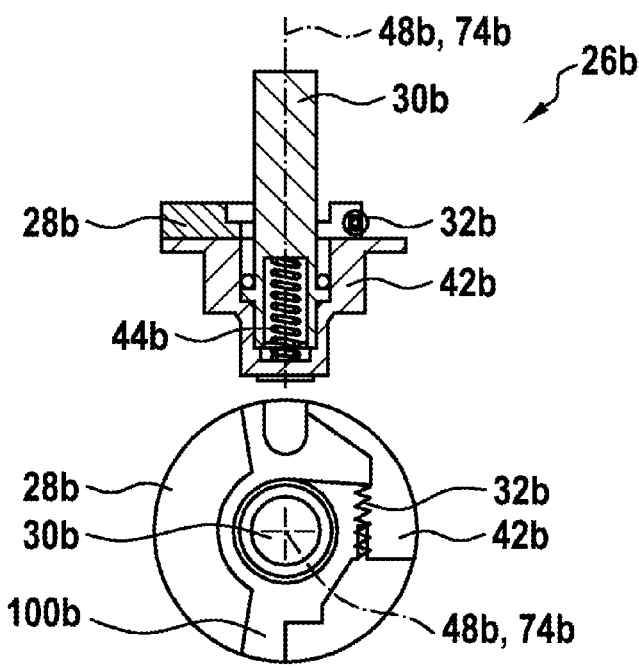
FIG. 5 shows a detail view of the decoupling unit of the alternative quick clamping device according the invention from FIG. 4 in a schematic illustration.

FIG. 5 shows a detail view of the decoupling unit 26b, which is designed as a centrifugal decoupling unit, in a decoupling position of the decoupling element 28b, wherein a sectional view of the decoupling unit 26b is illustrated in an upper region of FIG. 5, and a plan view of the decoupling unit 26b is illustrated in a lower region of FIG. 5. The decoupling element 28b is designed as a centrifugal weight. The decoupling element 28b is mounted, so as to be rotatable relative to a transmission element 42b of the clamping unit 16b about an axis running at least substantially parallel to the axis of rotation 48b, on the transmission element 42b. The transmission element 42b is connected rotationally conjointly to the output shaft 12b. By means of the spring element 32b, the decoupling element 28b can be acted on with a spring force into a coupling position of the decoupling element 28b. The decoupling element 28b is provided for opening up a guide recess 80b of the transmission element 42b, into which guide recess and actuating element 30b can be at least partially moved, in particular counter to a spring force of a decoupling spring element 44b of the decoupling unit 26b, in a manner dependent on a rotational speed of the output shaft 12b, in particular in a manner dependent on a centrifugal force that can be exerted on the decoupling element 28b as a result of rotation of the output shaft 12b. The actuating element 30b is, owing to an arrangement of the decoupling element 28b in the decoupling position of the decoupling element 28b, movable counter to a spring force of the decoupling spring element 44b. In the decoupling position of the decoupling element 28b, the actuating element 30b is movable along the axis of rotation 48b relative to the transmission element 42b and/or relative to the output shaft 12b, in particular is at least partially movable into the guide recess 80b of the transmission element 42b, owing to an action of a force exerted by operator. The decoupling element 28b comprises a projection 100b, against which the actuating element 30b can be caused to bear in the coupling position of the decoupling element 28b, in which the guide recess 80b of the transmission element 42b is at least partially closed by means of the decoupling element 28b. In the coupling position, an actuating force acting on the actuating element 30b can be transmitted via the decoupling element 28b to the transmission element 42b. With regard to further features of the quick clamping device 10b illustrated in FIGS. 4 and 5, reference may be made at least in part to the description of the quick clamping device 10a illustrated in FIGS. 1 to 3.

Figure 6:
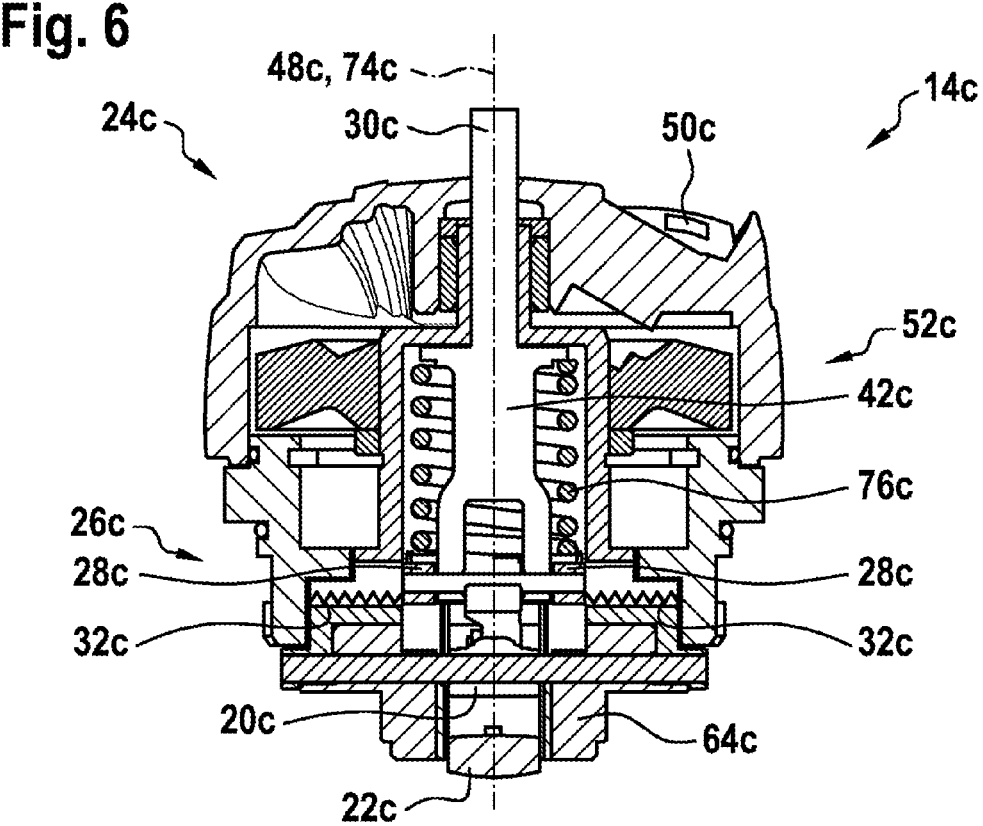
FIG. 6 shows a sectional view of a further alternative portable power tool according to the invention and of a further alternative quick clamping device according to the invention having a further alternative decoupling unit in a schematic illustration.

FIG. 6 shows a sectional view of an alternative portable power tool 14c and of an alternative quick clamping device 10c. The portable power tool 14c illustrated in FIG. 6 has an at least substantially analogous design in relation to the portable power tool 14a described in the description relating to FIGS. 1 to 3. The quick clamping device 10c for the portable power tool 14c, which has at least the output shaft 12c that can be driven in rotation, comprises at least one clamping unit 16c, which, for tool-free fixing of the insert tool unit (not illustrated in any more detail here) to the output shaft 12c, has at least one movably mounted clamping element 20c, 22c, in particular at least two movably mounted clamping elements 20c, 22c, for the action of a clamping force on the insert tool unit in a clamping position of the clamping element 20c, 22c.

Furthermore, the quick clamping device 10c comprises at least one operator control unit 24c for moving the clamping element 20c, 22c into the clamping position and/or into a release position of the clamping element 20c, 22c, in which the insert tool unit is removable from the clamping unit 16c and/or from the output shaft 12c. The operator control unit 24c comprises at least one movably mounted operator control element (not illustrated in any more detail here) which is provided for acting on an actuating element 30c of the operator control unit 24c in order to move the clamping element 20c, 22c into the clamping position and/or into a release position. The actuating element 30c is connected rotationally conjointly to the output shaft 12c and is mounted so as to be movable in translational fashion in the output shaft 12c. The actuating element 30c is in particular formed integrally with the transmission element 42c of the clamping unit 16c. It is however also conceivable for the actuating element 30c and/or the operator control unit 24c to be designed analogously to the actuating element 30a illustrated in FIGS. 1 to 3 and/or to the operator control unit 24a illustrated in FIGS. 1 to 3.

Furthermore, the quick clamping device 10c comprises at least one decoupling unit 26c which is provided for decoupling the decoupling the operator control unit 24c from the clamping unit 16c in a manner dependent on a rotational speed of the output shaft 12c. The decoupling unit 26c is designed as a centrifugal decoupling unit. The decoupling unit 26c comprises at least one movably mounted decoupling element 28c, which is movable counter to a spring force of at least one spring element 32c of the decoupling unit 26c in a manner dependent on a rotational speed of the output shaft 12c. The decoupling element 28c is preferably movable along a direction running at least substantially perpendicular to an axis of rotation 48c of the output shaft 12c, counter to a spring force of the spring element 32c, owing to an action of a centrifugal force that can be caused by the rotation of the output shaft 12c and exerted on the decoupling element 28c. The decoupling unit 26c preferably comprises at least two decoupling elements 28c, which are each movable counter to a spring force of at least one spring element 32c of the decoupling unit 26c in a manner dependent on a rotational speed of the output shaft 12c. It is preferable for each of the decoupling elements 28c to be movable counter to a spring force of a spring element 32c of the decoupling unit 26c, which spring element is assigned to the corresponding decoupling element 28c. It is however also conceivable for the decoupling unit 26c to have a number of decoupling elements 28c other than two. The decoupling element 28c is mounted so as to be movable, in particular movable in translational fashion, along a direction running at least substantially perpendicular to the axis of rotation 48c of the output shaft 12c. Owing to a movement of the decoupling element 28c along the direction running at least substantially perpendicular to the axis of rotation 48c of the output shaft 12c, a movement of the actuating element 30c and/or of the transmission element 42c along the axis of rotation 48c can be blocked. With regard to further features of the quick clamping device 10c illustrated in FIG. 6, reference may be made at least in part to the description of the quick clamping device 10a illustrated in FIGS. 1 to 3 and/or to the quick clamping device 10b illustrated in FIGS. 4 to 6.

Figure 7:
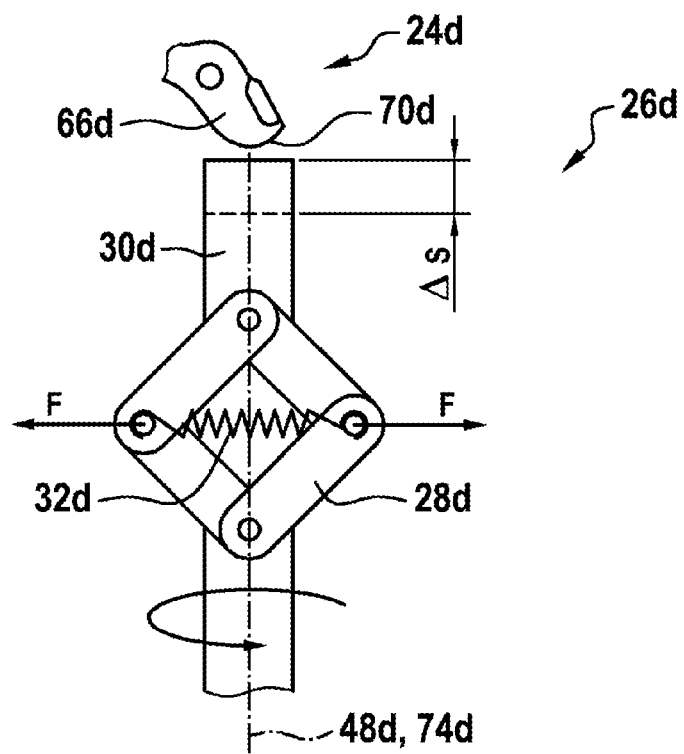
FIG. 7 shows a detail view of a further alternative decoupling unit of a further alternative quick clamping device according to the invention in a schematic illustration.

FIG. 7 shows a detail view of an alternative decoupling unit 26d. The decoupling unit 26d is designed as a centrifugal decoupling unit. The decoupling unit 26d comprises at least one movably mounted decoupling element 28d, which is movable counter to a spring force of at least one spring element 32d of the decoupling unit 26d in a manner dependent on a rotational speed of the output shaft. The decoupling element 28d is designed as a scissor joint element. The spring element 32d is provided for acting on limbs of the decoupling element 28d designed as a scissor joint element with a spring force which moves the limbs toward one another along a direction running at least substantially perpendicular to an axis of rotation 48d of the output shaft, in particular when a centrifugal force is withdrawn. An actuating element 30d may be formed integrally with the decoupling element 28d. With regard to further features of the decoupling unit 26d illustrated in FIG. 7, reference may be made at least in part to the description of the decoupling unit 26a illustrated in FIGS. 1 to 3 and/or to the decoupling unit 26b, 26c illustrated in FIGS. 4 to 6.

Figure 8:
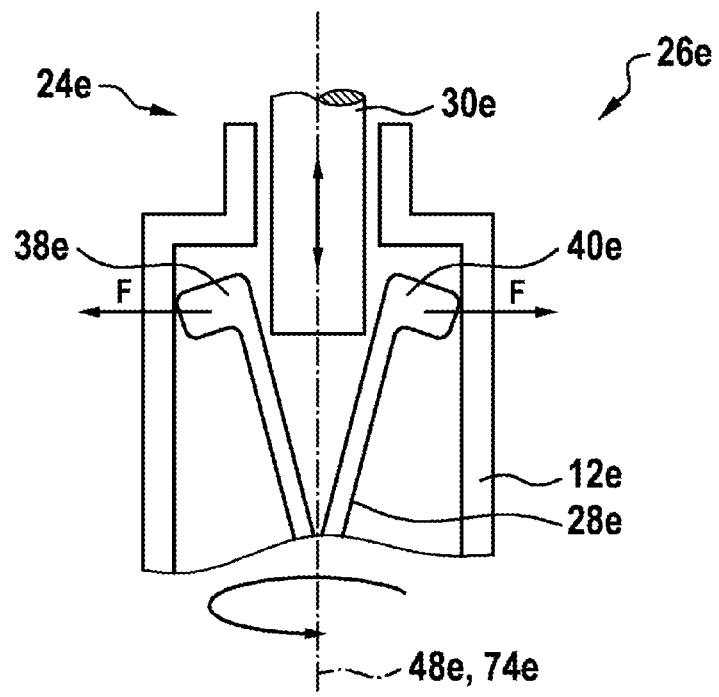
FIG. 8 shows a detail view of a further alternative decoupling unit of a further alternative quick clamping device according to the invention in a schematic illustration.

FIG. 8 shows a detail view of an alternative decoupling unit 26e. The decoupling unit 26e is designed as a centrifugal decoupling unit. The decoupling unit 26e comprises at least one decoupling element 28e which has a movable coupling projection 38e, 40e for a connection to an actuating element 30e of the operator control unit 24e in a manner dependent on a rotational speed of the output shaft 12e. The decoupling element 28e preferably comprises at least two coupling projections 38e, 40e which are movable relative to one another, in particular along a direction running at least substantially perpendicular to an axis of rotation 48e of the output shaft 12e, owing to a centrifugal force. The decoupling element 28e is of elastic form, in particular owing to a small material thickness, at least in a connecting region in which the coupling projections 38e, 40e are connected to one another. With regard to further features of the decoupling unit 26e illustrated in FIG. 8, reference may be made at least in part to the description of the decoupling unit 26a illustrated in FIGS. 1 to 3 and/or to the decoupling unit 26b, 26c, 26d illustrated in FIGS. 4 to 7.

Figure 9:
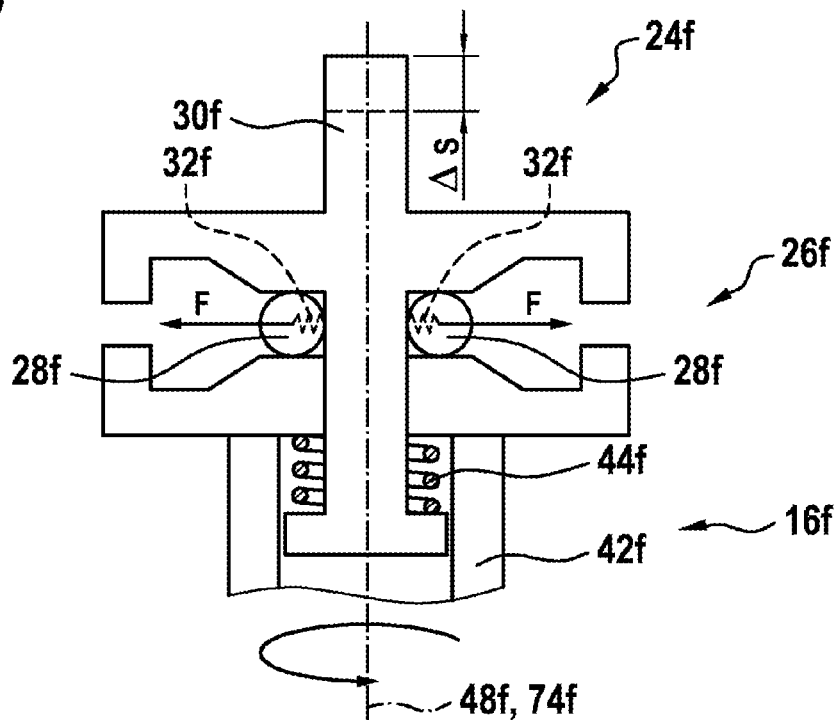
FIG. 9 shows a detail view of a further alternative decoupling unit of a further alternative quick clamping device according to the invention in a schematic illustration.

FIG. 9 shows a detail view of an alternative decoupling unit 26f. The decoupling unit 26f is designed as a centrifugal decoupling unit. The decoupling unit 26f comprises at least one movably mounted decoupling element 28f, which is movable counter to a spring force of at least one spring element 32f of the decoupling unit 26f, in particular along a direction running at least substantially perpendicular to an axis of rotation 48f of an output shaft, in a manner dependent on a rotational speed of the output shaft. The decoupling unit 26f preferably comprises at least two decoupling elements 28f which are movable relative to one another. In a coupling position of the decoupling elements 28f, the decoupling elements 28f are arranged between an actuating element 30f of an operator control unit 24f and a transmission element 42f of the clamping unit 16f along a direction running at least substantially parallel to the axis of rotation 48f. In the coupling position of the decoupling elements 28f, the decoupling elements 28f preferably bear against the actuating element 30f and against the transmission element 42f. The transmission element 42f and the actuating element 30f are movable jointly along the axis of rotation 48f. Owing to an action of a centrifugal force on the decoupling elements 28f, the decoupling elements 28f can be moved out between the actuating element 30f and the transmission element 42f, in particular along a direction running at least substantially perpendicular to the axis of rotation 48f. The actuating element 30f is movable relative to the transmission element 42f counter to a spring force of a decoupling spring element 44f of the decoupling unit 26f. With regard to further features of the decoupling unit 26f illustrated in FIG. 9, reference may be made at least in part to the description of the decoupling unit 26a illustrated in FIGS. 1 to 3 and/or to the decoupling unit 26b, 26c, 26d, 26e illustrated in FIGS. 4 to 8.

Figure 10:
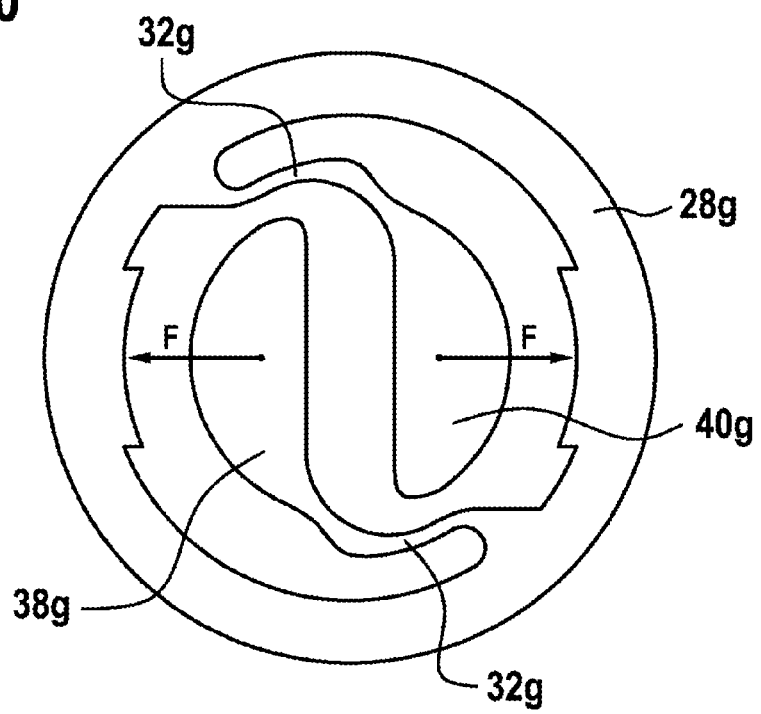
FIG. 10 shows a detail view of a further alternative decoupling unit of a further alternative quick clamping device according to the invention in a schematic illustration.

FIG. 10 shows a special design of a decoupling element 28g for a decoupling unit 26f as per FIG. 9. The decoupling element 28 comprises two coupling projections 38g, 40g, which are movable relative to one another. The coupling projections 38g, 40g are movable relative to one another owing to an elastic deformation of the decoupling elements 28g resulting from an action of a centrifugal force on the decoupling element 28g. With regard to further features of the decoupling unit 26g illustrated in FIG. 10, reference may be made at least in part to the description of the decoupling unit 26a illustrated in FIGS. 1 to 3 and/or to the decoupling unit 26b, 26c, 26d, 26e, 26f illustrated in FIGS. 4 to 9.

Figure 11:
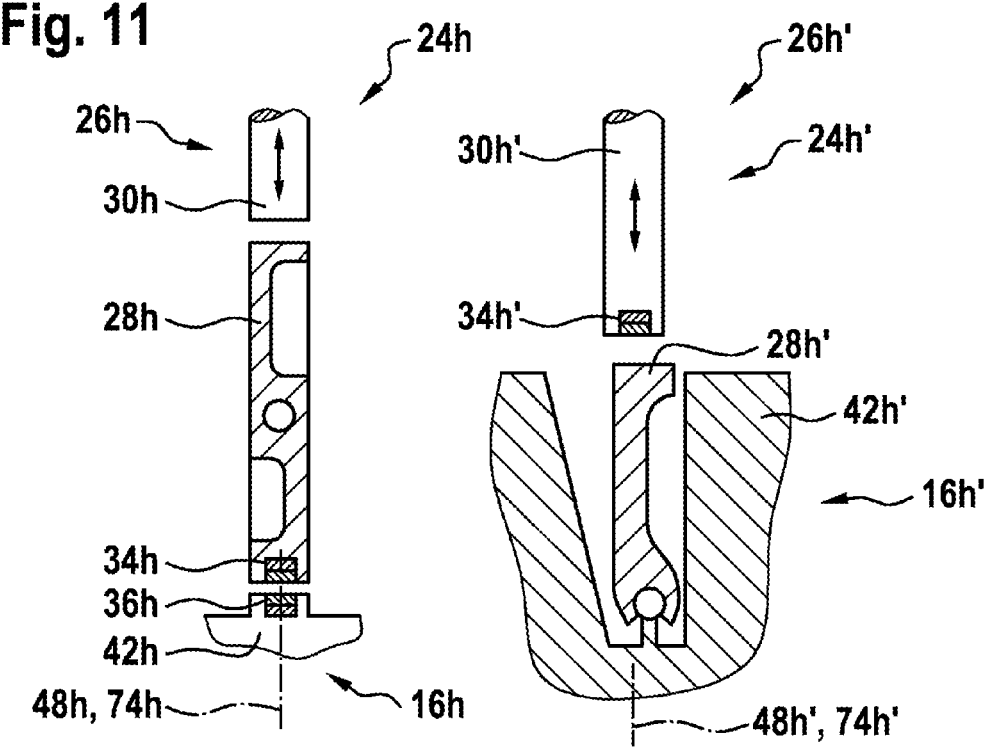
FIG. 11 shows a detail view of a further alternative decoupling unit of a further alternative quick clamping device according to the invention in a schematic illustration.

FIG. 11 shows a detail view of an alternative decoupling unit 26h, 26h'. The decoupling unit 26h, 26h' is designed as a centrifugal decoupling unit. The decoupling unit 26h, 26h' comprises at least one movably, in particular rotatably, mounted decoupling element 28h'. A movement axis of the decoupling element 28h' runs at least substantially perpendicular to an axis of rotation 48h of an output shaft. The decoupling unit 26h, 26h' comprises at least the movably mounted decoupling element 28h, 28h', which is movable in a manner dependent on a rotational speed of the output shaft, and at least one magnet element 34h, 36h, 34h' for a restoring movement of the decoupling element 28h, 28h' into a coupling position of the decoupling element 28h, 28h'. The magnet element 34h is fixed to the decoupling element 28h, in particular is formed integrally with the decoupling element 28h. A further magnet element 36h of the decoupling unit 26h is arranged on a transmission element 42h of a clamping unit 16h. It is however also conceivable for the magnet element 34h' to be arranged on an actuating element 30h' of an operator control unit 24h' (cf. left-hand region of FIG. 11). With regard to further features of the decoupling unit 26h, 26h' illustrated in FIG. 11, reference may be made at least in part to the description of the decoupling unit 26a illustrated in FIGS. 1 to 3 and/or to the decoupling unit 26b, 26c, 26d, 26e, 26f, 26g illustrated in FIGS. 4 to 10.

Figure 12:
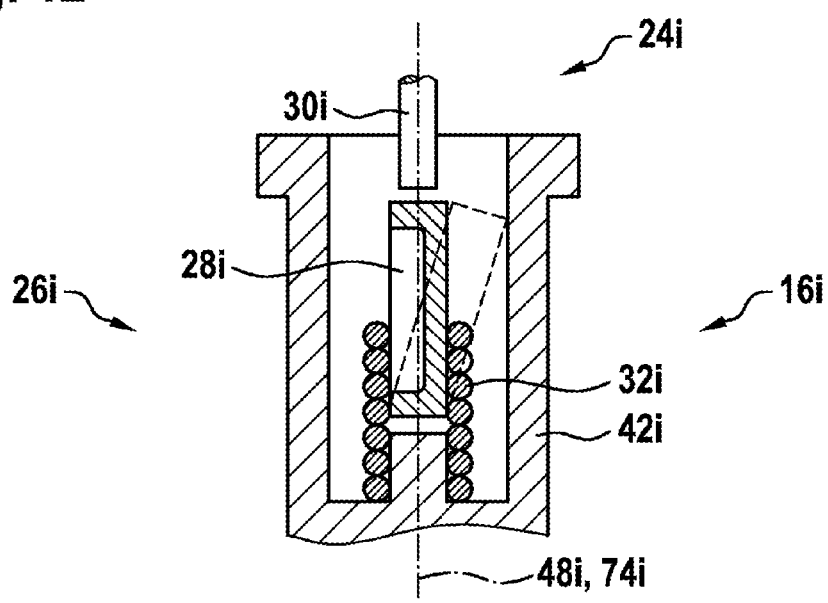
FIG. 12 shows a detail view of a further alternative decoupling unit of a further alternative quick clamping device according to the invention in a schematic illustration.

FIG. 12 shows a detail view of an alternative decoupling unit 26i. The decoupling unit 26i is designed as a centrifugal decoupling unit. The decoupling unit 26i comprises at least one movably mounted decoupling element 28i which is movable counter to a spring force of at least one spring element 32i of the decoupling unit 26i in a manner dependent on a rotational speed of the output shaft. The decoupling element 28i is arranged in the spring element 32i. The decoupling element 28i is mounted in movable fashion by means of the spring element 32i. With regard to further features of the decoupling unit 26i illustrated in FIG. 12, reference may be made at least in part to the description of the decoupling unit 26a illustrated in FIGS. 1 to 3 and/or to the decoupling unit 26b, 26c, 26d, 26e, 26f, 26g, 26h, 26h' illustrated in FIGS. 4 to 11.

Figure 13:
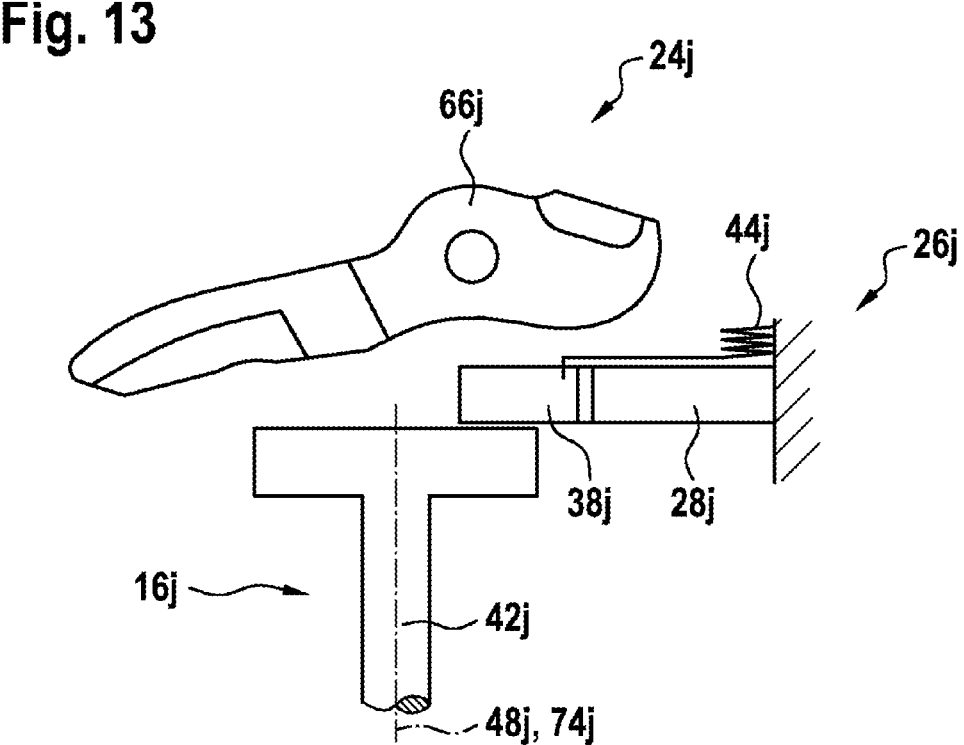
FIG. 13 shows a detail view of a further alternative decoupling unit of a further alternative quick clamping device according to the invention in a schematic illustration.

FIG. 13 shows a detail view of an alternative decoupling unit 26j. The decoupling unit 26j is designed as a friction-type decoupling unit. The decoupling unit 26j has at least one decoupling element 28j which has a movable coupling projection 38j for a connection to a transmission element 42j of the clamping unit 16j in a manner dependent on a rotational speed of an output shaft. The coupling projection 38j is arranged and/or mounted, in particular by means of a joint, by means of an elastic subregion or the like, on the decoupling element 28j so as to be movable relative to a main body of the decoupling element 28j. A movement axis of the coupling projection 38j runs at least substantially parallel to an axis of rotation 48j of the output shaft. The decoupling unit 26j has at least one decoupling spring element 44j, which acts on the coupling projection 38j with a spring force. In the event of a friction force being exerted on the coupling projection 38j by a transmission element 42j, which can be driven in rotation, of a clamping unit 16j, said coupling projection is movable relative to the main body of the decoupling element 28j. If a spring force of the decoupling spring element 44j is greater than a friction force acting on the coupling projection 38j, the coupling projection 38j is oriented in alignment with the main body of the decoupling element 28j. With regard to further features of the decoupling unit 26j illustrated in FIG. 13, reference may be made at least in part to the description of the decoupling unit 26a illustrated in FIGS. 1 to 3 and/or to the decoupling unit 26b, 26c, 26d, 26e, 26f, 26g, 26h, 26h', 26i illustrated in FIGS. 4 to 12.

Figure 14:
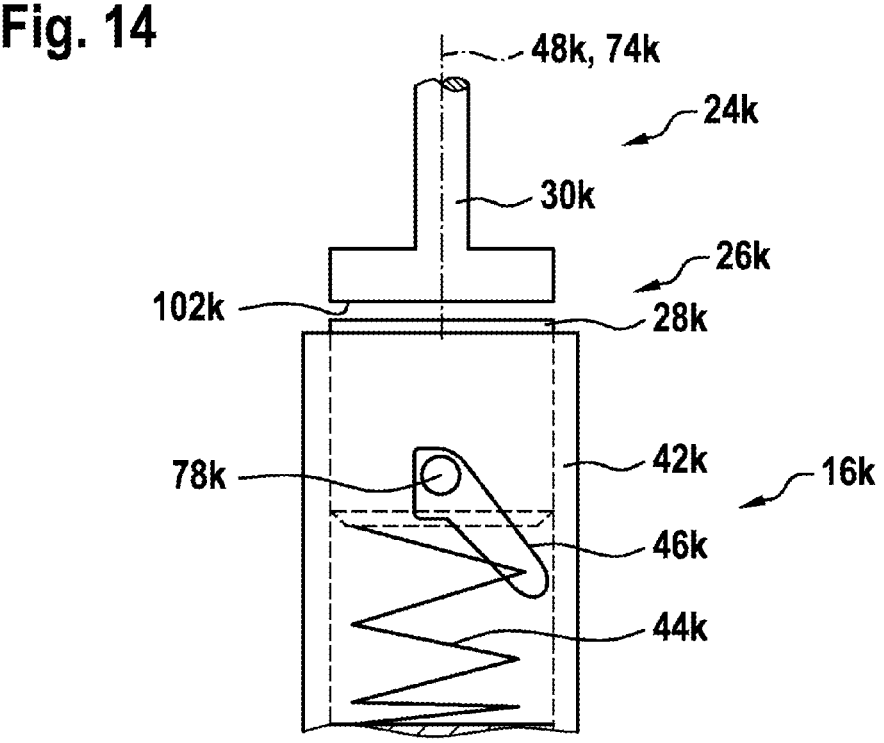
FIG. 14 shows a detail view of a further alternative decoupling unit of a further alternative quick clamping device according to the invention in a schematic illustration.

FIG. 14 shows a detail view of an alternative decoupling unit 26k. The decoupling unit 26k is designed as a friction-type decoupling unit. The decoupling unit 26k comprises a friction lining 102k, in particular a clutch friction lining. The friction lining 102k is fixed to an actuating element 30k of an operator control unit 24k, in particular is formed integrally with the actuating element 30k. The friction lining 102k is provided for interacting with a movably mounted decoupling element 28k. With regard to further features of the decoupling unit 26k illustrated in FIG. 14, reference may be made at least in part to the description of the decoupling unit 26a illustrated in FIGS. 1 to 3 and/or to the decoupling unit 26b, 26c, 26d, 26e, 26f, 26g, 26h, 26h', 26i, 26j illustrated in FIGS. 4 to 13.

Figure 15:
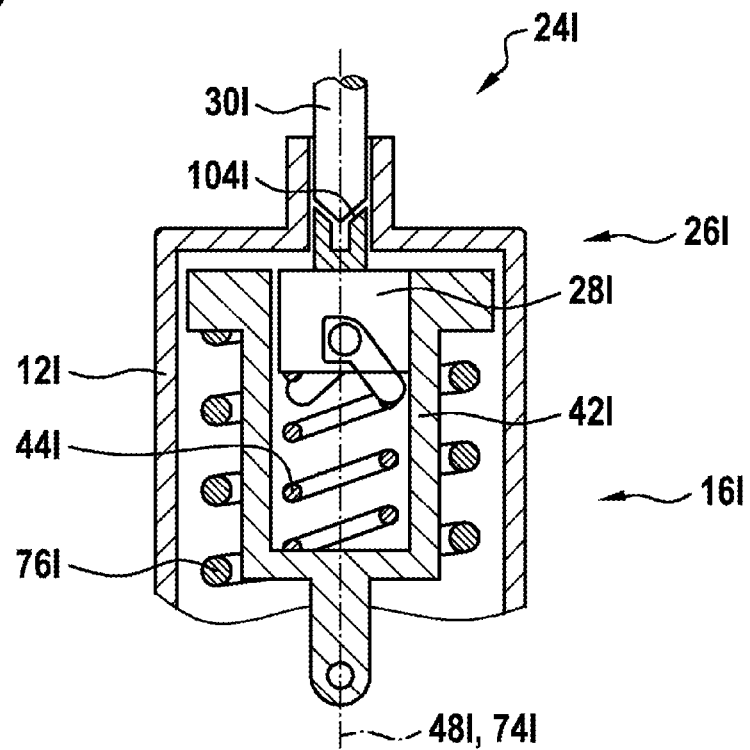
FIG. 15 shows a detail view of a further alternative decoupling unit of a further alternative quick clamping device according to the invention in a schematic illustration.

FIG. 15 shows a detail view of an alternative decoupling unit 26l. The decoupling unit 26l is designed as a friction-type decoupling unit. The decoupling unit 26l comprises at least one decoupling element 28l which has a conically running friction pairing recess 104l. The friction pairing recess 104l is provided for interacting with a conical connecting projection of an actuating element 30l of an operator control unit 24l. With regard to further features of the decoupling unit 26l illustrated in FIG. 15, reference may be made at least in part to the description of the decoupling unit 26a illustrated in FIGS. 1 to 3 and/or to the decoupling unit 26b, 26c, 26d, 26e, 26f, 26g, 26h, 26h', 26i, 26j, 26k illustrated in FIGS. 4 to 14.

Figure 16:
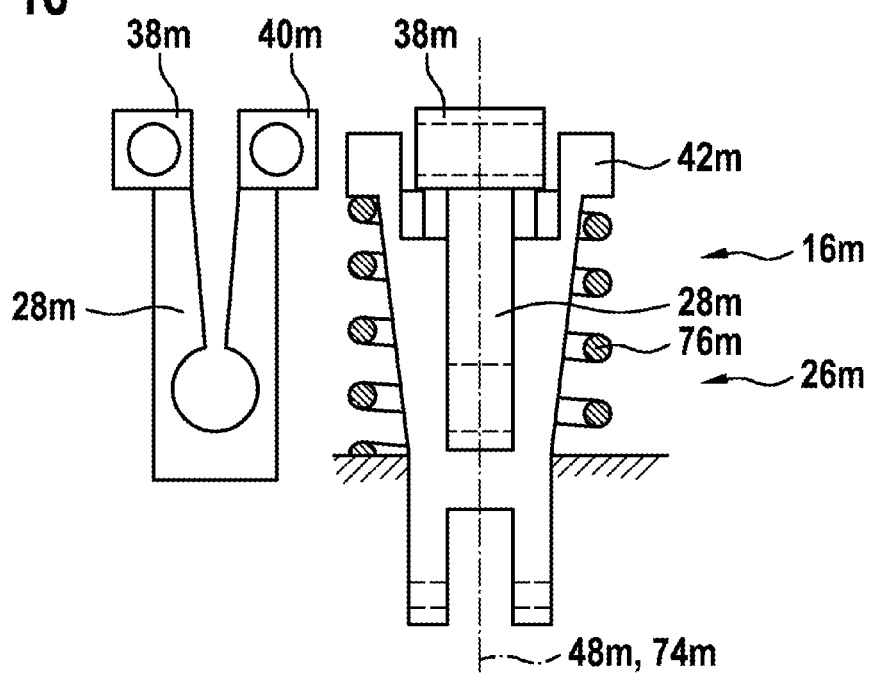
FIG. 16 shows a detail view of a further alternative decoupling unit of a further alternative quick clamping device according to the invention in a schematic illustration.

FIG. 16 shows a detail view of an alternative decoupling unit 26m. The decoupling unit 26m is designed as a centrifugal decoupling unit. The decoupling unit 26m comprises at least one decoupling element 28m which has a movable coupling projection 38m, 40m for a connection to an actuating element 30m of the operator control unit 24m in a manner dependent on a rotational speed of the output shaft 12m. The decoupling element 28m preferably comprises at least two coupling projections 38m, 40m which are movable relative to one another, in particular along a direction running at least substantially perpendicular to an axis of rotation 48m of the output shaft 12m, owing to a centrifugal force. The decoupling element 28m is of elastic form, in particular owing to a small material thickness, at least in a connecting region in which the coupling projections 38m, 40m are connected to one another. The decoupling element 28m is arranged in a transmission element 42m of a clamping unit 16m. With regard to further features of the decoupling unit 26m illustrated in FIG. 16, reference may be made at least in part to the description of the decoupling unit 26a illustrated in FIGS. 1 to 3 and/or to the decoupling unit 26b, 26c, 26d, 26e, 26f, 26g, 26h, 26h', 26i, 26j, 26k, 26l illustrated in FIGS. 4 to 15.

Figure 17:
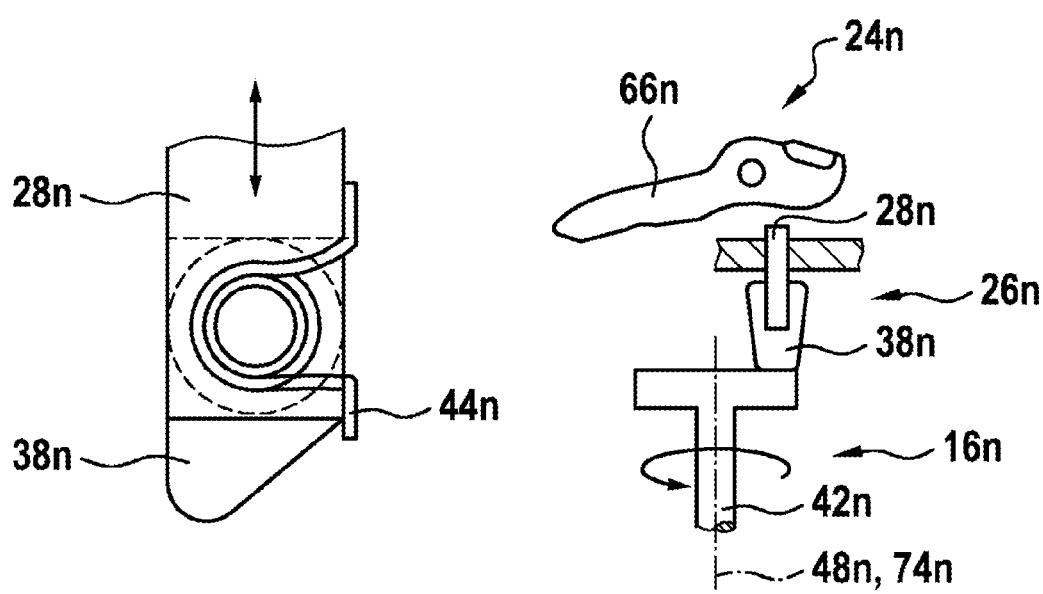
FIG. 17 shows a detail view of a further alternative decoupling unit of a further alternative quick clamping device according to the invention in a schematic illustration.

FIG. 17 shows a detail view of an alternative decoupling unit 26n. The decoupling unit 26n is designed as a friction-type decoupling unit. The decoupling unit 26n has at least one decoupling element 28n, which has a movable coupling projection 38n for a connection to a transmission element 42n of the clamping unit 16n in a manner dependent on a rotational speed of an output shaft. The coupling projection 38n is mounted on the decoupling element 28n so as to be movable relative to a main body of the decoupling element 28n. A movement axis of the coupling projection 38n runs at least substantially perpendicular to an axis of rotation 48n of the output shaft. The decoupling element 26n has at least one decoupling spring element 44n which acts on the coupling projection 38n with a spring force. In the event of a friction force being exerted on the coupling projection 38n by a transmission element 42n, which can be driven in rotation, of a clamping unit 16n, said coupling projection is movable relative to the main body of the decoupling element 28n. If a spring force of the decoupling element 44n is greater than a friction force acting on the coupling projection 38n, the coupling projection 38n is oriented in alignment with the main body of the decoupling element 28n. With regard to further features of the decoupling unit 26n illustrated in FIG. 17, reference may be made at least in part to the description of the decoupling unit 26a illustrated in FIGS. 1 to 3 and/or to the decoupling unit 26b, 26c, 26d, 26e, 26f, 26g, 26h, 26h', 26i, 26j, 26k, 26l, 26m illustrated in FIGS. 4 to 16.

The invention claimed is:

1. A quick clamping device for a portable power tool having at least one output shaft configured to be driven in rotation, the quick clamping device comprising:
 at least one clamping unit including at least one movably mounted clamping element configured to exert a clamping force on an insert tool unit in a clamping position of the at least one movably mounted clamping element, the at least one clamping unit configured for fixing the insert tool unit to the at least one output shaft without use of tools;
 at least one operator control unit configured to move the at least one movably mounted clamping element into the clamping position and/or into a release position of the at least one movably mounted clamping element; and
 at least one decoupling unit configured to decouple the at least one operator control unit from the at least one clamping unit in a manner dependent on a rotational speed of the at least one output shaft,
 wherein, in the release position, the insert tool unit is removable from the at least one clamping unit.

2. The quick clamping device as claimed in claim 1, wherein the at least one decoupling unit is configured such that, in the manner dependent on the rotational speed of the at least one output shaft, a relative movement occurs between at least one decoupling element of the at least one decoupling unit and at least one actuating element of the at least one operator control unit, the relative movement configured to decouple the at least one operator control unit from the at least one clamping unit.

3. The quick clamping device as claimed in claim 1, wherein:
 the at least one decoupling unit includes at least one movably mounted decoupling element; and
 in the manner dependent on the rotational speed of the at least one output shaft, the at least one movably mounted decoupling element is configured to be transferred into a decoupling position in which the at least one operator control unit is decoupled from the at least one clamping unit.

4. The quick clamping device as claimed in claim 1, wherein the at least one decoupling unit is a centrifugal decoupling unit.

5. The quick clamping device as claimed in claim 4, wherein:
 the at least one decoupling unit includes at least one movably mounted decoupling element; and
 in the manner dependent on the rotational speed of the at least one output shaft, the at least one movably mounted decoupling element is movable counter to a spring force of at least one spring element of the at least one decoupling unit.

6. The quick clamping device at least as claimed in claim 4, wherein:
 the at least one decoupling unit includes at least one movably mounted decoupling element and at least one magnet element;
 the at least one movably mounted decoupling element is movable in the manner dependent on the rotational speed of the at least one output shaft; and
 the at least one magnet element is configured to restore movement of the at least one movably mounted decoupling element into a coupling position of the at least one movably mounted decoupling element.

7. The quick clamping device as claimed in claim 4, wherein:
 the at least one decoupling unit includes at least one decoupling element having a movable coupling projection configured to connect to at least one of an actuating element of the at least one operator control unit and a transmission element of the at least one clamping unit in the manner dependent on the rotational speed of the at least one output shaft.

8. The quick clamping device as claimed in claim 1, wherein the at least one decoupling unit is a friction-type decoupling unit.

9. The quick clamping device as claimed in claim 8, wherein:
 the at least one decoupling unit includes at least one movably mounted decoupling element which is movable relative to the at least one output shaft via a friction force between the at least one movably mounted decoupling element and an actuating element of the at least one operator control unit.

10. The quick clamping device as claimed in claim 8, wherein:
 the at least one decoupling unit includes at least one movably mounted decoupling element and at least one decoupling spring element; and
 the at least one decoupling spring element acts on the at least one movably mounted decoupling element with a spring force in a direction toward the at least one operator control unit.

11. The quick clamping device as claimed in claim 8, wherein:
 the at least one decoupling unit includes at least one movably mounted decoupling element and at least one slotted-guide element; and
 the at least one slotted-guide element is configured to guide the at least one movably mounted decoupling element during a relative movement of the at least one movably mounted decoupling element with respect to the at least one output shaft.

12. The quick clamping device as claimed in claim 8, wherein:
 the at least one decoupling unit includes at least one movably mounted decoupling element mounted such that the at least one movably mounted decoupling element is movable in the at least one output shaft along and/or around an axis of rotation of the at least one output shaft.

13. The quick clamping device as claimed in claim 1, wherein the at least one decoupling unit includes at least one output element configured to output at least a functional state of the at least one decoupling unit to an operator.

14. The quick clamping device as claimed in claim 1, wherein the output shaft is an angle grinder output shaft.

15. A portable power tool, comprising:
- at least one output shaft configured to be driven in rotation; and
- a quick clamping device including:
  - at least one clamping unit including at least one movably mounted clamping element configured to exert a clamping force on an insert tool unit in a clamping position of the at least one movably mounted clamping element, the at least one clamping unit configured to for fixing the insert tool unit to the output shaft without use of tools;
  - at least one operator control unit configured to move the at least one movably mounted clamping element into the clamping position and/or into a release position of the at least one movably mounted clamping element; and
  - at least one decoupling unit configured to decouple the at least one operator control unit from the at least one clamping unit in a manner dependent on a rotational speed of the at least one output shaft,
  - wherein, in the release position, the insert tool unit is removable from the at least one clamping unit.

16. The portable power tool as claimed in claim 15, wherein the portable power tool is an angle grinder.

* * * * *